United States Patent
Hayashi

(10) Patent No.: US 8,239,680 B2
(45) Date of Patent: Aug. 7, 2012

(54) SECRET COMMUNICATION METHOD AND SECRET COMMUNICATION DEVICE THEREOF

(75) Inventor: Masahito Hayashi, Wako (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 770 days.

(21) Appl. No.: 12/374,227

(22) PCT Filed: Jun. 20, 2007

(86) PCT No.: PCT/JP2007/062375
§ 371 (c)(1),
(2), (4) Date: Mar. 24, 2009

(87) PCT Pub. No.: WO2008/013008
PCT Pub. Date: Jan. 31, 2008

(65) Prior Publication Data
US 2009/0316901 A1    Dec. 24, 2009

(30) Foreign Application Priority Data

Jul. 26, 2006 (JP) ................................. 2006-203984
Jul. 26, 2006 (JP) ................................. 2006-203985

(51) Int. Cl.
*H04L 9/32* (2006.01)
*H04L 9/00* (2006.01)

(52) U.S. Cl. .......... 713/169; 713/170; 713/171; 380/28; 380/255

(58) Field of Classification Search .......... 713/169–171; 380/28, 255
See application file for complete search history.

(56) References Cited

U.S. PATENT DOCUMENTS

| | | | | |
|---|---|---|---|---|
| 4,417,338 A | * | 11/1983 | Davida | 380/286 |
| 5,054,066 A | * | 10/1991 | Riek et al. | 380/30 |
| 5,732,139 A | * | 3/1998 | Lo et al. | 380/28 |
| 7,899,183 B2 | * | 3/2011 | Tajima et al. | 380/263 |
| 2005/0149840 A1 | * | 7/2005 | Lee et al. | 714/800 |
| 2006/0059343 A1 | * | 3/2006 | Berzanskis et al. | 713/171 |
| 2007/0133798 A1 | * | 6/2007 | Elliott | 380/255 |
| 2008/0222487 A1 | * | 9/2008 | Matsumoto | 714/758 |
| 2009/0138785 A1 | * | 5/2009 | Sakai et al. | 714/790 |
| 2009/0220083 A1 | * | 9/2009 | Schneider | 380/268 |

FOREIGN PATENT DOCUMENTS

| | | |
|---|---|---|
| JP | 2006 54638 | 2/2006 |
| WO | 2004 030270 | 4/2004 |
| WO | 2005 076520 | 8/2005 |

* cited by examiner

*Primary Examiner* — Haresh N Patel
*Assistant Examiner* — Catherine Thiaw
(74) *Attorney, Agent, or Firm* — Oblon, Spivak, McClelland, Maier & Neustadt, L.L.P.

(57) ABSTRACT

A secret communication method and a communication device used in the method are provided for secret communication using communication path less frequently as a whole while avoiding a duplicative use of public communication. The secret communication method includes steps of: estimating an error ratio of initial random numbers X, Y; estimating the upper limit of an eavesdrop information amount; determining an encryption function determined by the error correction code based on the estimated error probability, an error correction decoding function g, and a decryption auxiliary variable; uniquely determining a confidentiality increase matrix C based on the estimated upper limit value of the eavesdrop information amount and the encoding ratio of the error correction code; uniquely generating a ciphertext Z from information M to be sent to a receiver using the encryption function, the initial random number X, and the confidentiality increase matrix C; transmitting the ciphertext Z; and decrypting the ciphertext Z to a transmission text $M_B$ using the initial random number Y, the confidentiality increase matrix C, the decryption auxiliary variable, and the error correction decoding function g.

33 Claims, 12 Drawing Sheets

SECRET COMMUNICATION METHOD AND SECRET COMMUNICATION DEVICE THEREOF

TECHNICAL FIELD

The present invention relates to a secret communication method and a secret communication device thereof. More particularly, the present invention relates to an efficient information communication between two parties at remote locations who share correlated random numbers used for preventing leakage of the information to a third party under the situation that such information may be leaked to the third party.

FIRST BACKGROUND ART

Because of the explosive growth of the Internet and the practical application of electronic transaction, the social needs for encryption technology in view of confidentiality, prevention of alteration, and personal authentication in the communication are increasing. Currently, the common key system such as DES code and the public key system such as RSA code have been widely used. These systems are, however, designed on the basis of the "computational security". In other words, the existing encryption system is kept under threat of advancement in the computer hardware and the decryption algorithm. Practical realization of the encryption system that guarantees safety in principle may give a significant impact on the fields which require especially high security, for example, bank transaction and communication with respect to military and diplomatic information.

One-time-pad method is the encryption system which has been proved as exhibiting unconditional security according to the information theory. In the one-time-pad method, a disposable secret common key with the same length a message is used. However, the one-time-pad method is established under the strict condition where two parties at remote locations share the perfectly matched secret common key which allows no information leakage to the third party on the assumption that no error occurs. Generally, this may cause difficulties in the application. Meanwhile, the condition where two parties at remote locations share the correlated initial random numbers and such information may be leaked to the third party can be realized relatively easily. In fact, the sender and receiver share such random numbers using the quantum cryptography subsequent to the quantum communication, base collation and error probability estimation. Under this condition, the secret communication between two parties is highly demanded. Conventionally, the key distillation including the quantum cryptography described later is performed first, and then the secret communication with the one-time-pad method is performed by using the resultant key.

According to the above, the key distillation is a process performed to generate the perfectly matched secret common key for two parties, which allows substantially no information leakage to the third party, by performing communication properly between those two parties. The error-correcting code, such as Reed-Solomon code and LDPC code, has been well known to be used for coping with the communication which causes error with a certain probability. The use of the error-correcting code for the key distillation has been known (see Non-Patent Document 3).

The method for obtaining the error ratio of the initial random number generated through the quantum communication and the upper limit of an amount of information eavesdropped by the eavesdropper has been researched in various studies with respect to the quantum cryptography. Accordingly, the initial random number generation unit, the device for estimating the error ratio with respect to the initial random number, and the device for estimating the upper limit of the eavesdropped information amount are considered as background of the present invention.

The generally employed secret communication device is operated using the one-time-pad method which allows the key distillation device to generate the secret common key for the purpose of transmitting the information from the sender to the receiver based on the initial random numbers of the sender and the receiver without leakage of the information to the third party (see Non-Patent Document 2).

The configuration of the secret communication device explained with respect to the secret communication method (see Non-Patent Document 2) will be described hereinafter.

FIG. 1 is a block diagram of a secret communication device as related art (Non-Patent Document 2) and FIG. 2 is a flowchart showing the secret communication method.

Referring to FIGS. 1 and 2, the secret communication device is formed of a key distillation section A and a one-time-pad secret communication section B. The key distillation section A includes initial random number generation units 1, 15, initial random number storage units 2, 16, transmission units 9, 28, public communication paths 10, 29, reception units 11, 30, common key generation units 24, 26, confidentiality increase matrix generation units 8, 18, a parity check matrix generation unit 25, an error correction code decoding function generation unit 21, an error ratio estimation unit 4, and an eavesdrop information amount estimation unit 19. The one-time-pad secret communication section B includes the transmission unit 28, the public communication path 29, the reception unit 30, an input unit 6, an output unit 20, an encryption unit 27, and a decryption unit 31. The error ratio estimation unit 4 and the eavesdropped information amount estimation unit 19 are provided for the sender side as an example, however, they may be provided for the receiver side.

The error ratio estimation unit 4 estimates the ratio of error which occurs in the initial random numbers shared by the sender S and the receiver R to determine an encoding ratio. The parity check matrix generation unit 25 preliminarily stores the encoding function corresponding to the error ratio value. The error correction code decoding function generation unit 21 preliminarily stores the decoding function corresponding to the error ratio. The eavesdropped information amount estimation unit 19 estimates the upper limit value of the amount of the information which may be eavesdropped by the eavesdropper. The confidentiality increase matrix generation units 8, 18 preliminarily store the confidentiality increase matrix uniquely determined by the eavesdropped information amount and the encoding ratio. The common key generation unit 24 of the sender S generates the common key based on the initial random number, the confidentiality increase matrix and the encoding function. The common key generation unit 26 of the receiver R generates the common key based on the initial random number, the confidentiality increase matrix, the decoding function, and the bit sequence sent from the sender S. According to Non-Patent Document 2, the initial random number generation units 1, 15, the error ratio estimation unit 4 and the eavesdropped information amount estimation unit 19 are configured by using the quantum communication.

Next, the operation of the secret communication device explained in Non-Patent Document 2 will be described.

The correlated initial random numbers are generated by the initial random number generation units 1, 15 of the sender S and the receiver R, respectively (step S1) and stored in the respective initial random number storage units 2, 16 (step S2, S3). At the same time, the ratio of error which occurs in those random numbers (error ratio) is estimated by the error ratio estimation unit 4 (step S4). The parity check matrix generation unit 25 generates the encoded parity check matrix corresponding to the error ratio value estimated by the error ratio estimation unit 4 (step S5). The error correction code decoding function generation unit 21 generates the decoding function corresponding to the encoding using the error ratio estimation unit 4 (step S6). The eavesdrop information amount estimation unit 19 estimates the upper limit value of the amount of information with respect to the random number which may be eavesdropped by the eavesdropper (step S7). It is then determined whether or not the eavesdropped information amount is larger than the threshold value determined by the estimated error ratio (step S8). If the amount is larger than the threshold value, the process returns to start generating the initial random numbers again. Meanwhile, if the amount is smaller than the threshold value, the confidentiality increase matrix generation units 8, 18 of the sender S and the receiver R generate the confidentiality increase matrices, respectively (step S9, S10). The sender S operates the common key generation unit 24 to generate the common key determined by the initial random number, the confidentiality increase matrix, and the encoded function (step S11). The sender S operates the common key generation unit 24 to generate the information with respect to the syndrome required for the receiver R to generate the common key. The information is then transmitted through the public communication path 10 (step S12). The receiver R uses the bit sequence sent from the sender S to allow the common key generation unit 26 to generate the common key by the initial random number, the confidentiality increase matrix, and the decoding function (step S13). This is the operation of the key distillation section A.

The operation of the one-time-pad secret communication section B will be described.

The sender S performs XOR operation of the input information (step S14) and the common key to generate the ciphertext (step S15) using the encryption unit 27. The ciphertext is sent to the receiver R through the public communication path 29 (step S16). Then the receiver R performs XOR operation of the received ciphertext and the common key to decrypt the ciphertext using the decryption section 31 (step S17).

In Non-Patent Document 2, the common key generation unit 24 of the sender S is formed of the syndrome generation unit and the common key generation unit. Those components are collectively called as the common key generation unit 24 so as to be compared with the present invention.

In Non-Patent Document 2, the common key generation unit 26 of the receiver R is formed of the syndrome decoding unit and the common key generation unit. Those components are collectively called as the common key generation unit 26 so as to be compared with the present invention.

In case of the quantum cryptography, key distillation of the correlated random number is performed after the quantum communication, the base collation and the error ratio estimation to generate the secret common key (see Patent Document 2). Thereafter, the secret communication is normally executed using the generated secret common key.

The system for delivering interference quantum encryption key (Patent Document 1) and the method for delivering quantum key and communication device (Patent Document 2) have been disclosed.

SECOND BACKGROUND ART

Besides the aforementioned first background art, the second background art will be described.

The method for enhancing confidentiality using Toeplitz matrix is well known (see Non-Patent Document 2).

The secret communication device of the aforementioned type allows the sender to send the information to the receiver based on the initial random numbers owned by the sender and the receiver, respectively without leakage of the information to the third party. Conventionally, the secret common key is generated by the key distillation device first, and then the one-time-pad method is conducted using the secret common key for executing the secret communication (see Non-Patent Document 5).

The configuration of the secret communication device explained in the secret communication method (method according to Non-Patent Document 5) will be described hereinafter.

FIG. 3 is a block diagram of the secret communication device of a related art (Non-Patent Document 5) and FIG. 4 is an operation flowchart of the process executed in the secret communication device.

Referring to FIGS. 3 and 4, the secret communication device is formed of a key distillation section A and a one-time-pad secret communication section B. The key distillation section A includes initial random number generation units 51, 65, initial random number storage units 52, 66, transmission units 59, 62, 78, public communication paths 60, 63, 79, reception units 61, 68, 80, common key generation units 74, 76, a confidentiality increase matrix generation unit 58, an encoding function generation unit 94, an error correction code decoding function generation unit 71, an error ratio estimation unit 54, an eavesdropped information amount estimation unit 69, converters 90, 91, an encoding unit 92, and an error correction decoding unit 93. The one-time-pad secret communication section B includes a transmission unit 78, a public communication path 79, a reception unit 80, an input unit 56, an output unit 70, an encryption unit 77, and a decryption unit 81. The error ratio estimation unit 54 and the eavesdropped information amount estimation unit 69 are provided for the sender side, however, they may be provided for the receiver side.

The error ratio estimation unit 54 estimates the ratio of the error which occurs in the initial random numbers of the sender S and the receiver R to determine the encoding ratio. The encoding function generation unit 94 preliminarily stores the coded function corresponding to the error ratio. The eavesdrop information amount estimation unit 69 estimates the upper limit value of the amount of information with respect to the initial random number of the sender S which can be eavesdropped by the eavesdropper. The confidentiality increase matrix generation unit 58 preliminarily stores the confidentiality increase matrix uniquely determined by the eavesdropped information amount and the encoding ratio. The common key generation unit 74 of the sender S generates the common key based on the initial random number, the confidentiality increase matrix, and the encoding function. The common key generation unit 76 of the receiver R generates the common key based on the initial random number, the confidentiality increase matrix, the decoding function, and the bit sequence sent from the sender S. According to Non-Patent Document 5, the initial random number generation units 51, 65, the error ratio estimation unit 54, and the eavesdropped information amount estimation unit 69 are configured using the quantum communication.

The operation of the secret communication device according to Non-Patent Document 5 will be described hereinafter.

The initial random number generation units 51, 65 of the sender S and the receiver R generate the correlated initial random numbers, respectively (step S21), and the resultant numbers are stored in the initial random number storage units 52, 66, respectively (step S22, 23). At the same time, the error ratio estimation unit 54 estimates the ratio of error which occurs in the random numbers (error ratio) (step S24). The encoding function generation unit 94 generates the encoding function corresponding to the error ratio estimated (step S24) by the error ratio estimation unit 54 (step S25). The error correction code decoding function generation unit 71 generates the decoding function corresponding to the encoding using the error ratio estimation unit 54 (step S26). The eavesdropped information amount estimation unit 69 estimates the upper limit value of the amount of information with respect to the random number which may be eavesdropped by the eavesdropper. Then it is determined whether or not the estimated eavesdropped information amount is larger than the threshold value determined by the estimated error ratio. If the amount is larger than the threshold value, the process returns to start generating the initial random numbers again. Meanwhile, if the amount is smaller than the threshold value, the sender S operates the confidentiality increase matrix generation unit 58 to generate the confidentiality increase matrix (step S32) so as to be transmitted through the transmission unit 62, the public communication path 63, and the reception unit 68 (step S34).

The sender S operates the random number generation unit 55 to generate the random number (step S27), and further operates the encoding unit 92 for encoding (step S28). The encoded bit sequence is converted by the converter 90 using the initial random number (step S29), and the converted bit sequence is transmitted to the receiver R through the transmission unit 59, the public communication path 60, and the reception unit 61 (step S30). The receiver R operates the converter 91 to convert the received bit sequence using the initial random number and decodes the converted bit sequence using the error correction decoding unit 93 (step S31). The common key generation unit 76 is operated to generate the common key using the confidentiality increase matrix (step S35).

This is the operation of the key distillation section A.

The operation of the one-time-pad secret communication section B will be described.

The sender S operates the encryption unit 77 to perform XOR operation of the input information (step S36) and the common key, which is formed into the ciphertext (step S37). The ciphertext is sent to the receiver R through the public communication path 79 (step S38). Then the receiver R performs XOR operation of the ciphertext received in the decryption unit 81 and the common key for decrypting the ciphertext (step S39).

In case of the quantum cryptography, key distillation of the obtained correlated random number is performed after the quantum communication, the base collation and the error ratio estimation to form the secret common key (for example, see Patent Documents 2 and 5). The secret communication is generally executed thereafter using the secret common key. The inventor of the present invention has proposed the method for quantitatively evaluating the safety of the key distillation based on the protocol for determining the confidentiality increase matrix after generating the initial random number generated through the quantum communication (see Non-Patent Document 5).

The system for delivering interference quantum cryptography key (Patent Document 1) and the quantum key delivery method and communication device (Patent Document 2) are also disclosed.

Patent Document 1: U.S. Pat. No. 5,307,410

Patent Document 2: Japanese Patent Application Publication No. 2004-274459

Non-Patent Document 1: C. H. Bennett and B. Brassard, "Quantum Cryptography: Public Key Distribution and Coin Tossing," in Proc. IEEE International Symposium on Computer, systems, and signal processing, pp. 175-179

Non-Patent Document 2: H. Krawczyk, "Advances in Cryptology—CRYPTO '94 (Springer-Verlag), LNCS839, pp. 129-139, (1994), "LFSR-based Hashing and Authentication"

Non-Patent Document 3: Y. Watanabe, W. Matsumoto and H. Imai, "Information reconciliation in quantum key distribution using low-density parity-check codes," in Proc. of International Symposium on Information Theory and its Applications, ISITA 2004, Parma, Italy, pp. 1265-1269 (October, 2004)

Non-Patent Document 4: Peter W. Shor and John Preskill, "Simple Proof of Security of the BE84 Quantum Key Distribution Protocol," in Physical Review Letters volume 85, pp. 441-444, (2000)

Non-Patent Document 5: M. Hayashi, "Practical Evaluation of Security for Quantum Key Distribution," http://lanl.arxiv.org/abs/quant-ph/0602113

DISCLOSURE OF INVENTION

In the related art described in the first background art, the first problem is that the secret communication through two stages including the key distillation section for generating the common key and the one-time-pad secret communication section requires the use of the public communication twice because the public communication path is used for both the key distillation section and the one-time-pad secret communication section.

The second problem of the related art is that the workload of the entire secret communication is heavy as the work is required for both the key distillation section and the one-time-pad secret communication section.

The third problem of the related art is that the public communication is required to be executed three times in total, i.e., twice for the key distillation section for generating the common key and once for the one-time-pad secret communication section. This is because the public communication path is used for both the key distillation section and the one-time-pad secret: communication section. It is well known that generating the confidentiality matrix using Toeplitz matrix after generating the initial random number is superior to ensuring enhanced security. Accordingly, the secret communication using the public communication path as little as possible is required under the condition where the confidentiality matrix is formed after generating the initial random number to be transmitted through the public communication path for the purpose of ensuring the enhanced security.

The first object of the present invention is to provide a secret communication method and a secret communication device for executing the secret communication using the public communication path less frequently by avoiding duplicative use of the public communication.

The second object of the present invention is to reduce the workload over the entire secret communication by improving the conventionally employed work required for the key distillation section and the one-time-pad secret communication section.

Furthermore, a third object of the present invention is to provide the secret communication method and the secret communication device for executing the secret communication using the public communication path less frequently by avoiding the duplicative public communication under the condition where the transmission is performed with the public communication path by generating the confidentiality matrix after generating the initial random number.

To achieve the above described objects, the present invention provides:

[1] A secret communication method for efficiently communicating information between a sender and a receiver at remote locations using correlated initial random numbers X and Y respectively held by the sender and the receiver without leakage of the information to a third party under the situation that the information may be leaked to the third party includes:
(a) step of estimating each error ratio of the initial random numbers X and Y;
(b) step of estimating an upper limit of an eavesdropped information amount;
(c) step of determining an error correction code based on an estimated value of the error ratio, an encryption function corresponding to the error correction code, an error correction decoding function g, and a decryption auxiliary variable;
(d) step of uniquely determining a confidentiality increase matrix C based on the estimated upper limit value of the eavesdropped information amount and an encoding ratio of the error correction code;
(e) step of uniquely generating a ciphertext Z from transmission information M to be sent to the receiver using the encryption function, the initial random number X, and the confidentiality increase matrix C;
(f) step of transmitting the ciphertext Z; and
(g) step of decrypting the ciphertext Z to a transmission text $M_B$ using the initial random number Y, the confidentiality increase matrix C, the decryption auxiliary variable, and the error correction decoding function g.

[2] A secret communication method for efficiently communicating information between a sender and a receiver at remote locations using correlated initial random numbers X and Y respectively held by the sender and the receiver without leakage of the information to a third party under the situation that the information may be leaked to the third party includes:
(a) step of estimating each error ratio of the initial random numbers X and Y;
(b) step of estimating an upper limit of an eavesdrop information amount;
(c) step of determining an error correction code based on an estimated value of the error ratio, an encryption function F corresponding to the error correction code, and an error correction decoding function g;
(d) step of uniquely determining a confidentiality increase matrix C based on the estimated upper limit value of the eavesdropped information amount and an encoding ratio of the error correction code;
(e) step of uniquely generating a ciphertext Z from transmission information M to be sent to the receiver using the encryption function, the initial random number X, the confidentiality increase matrix C and a random number D;
(f) step of transmitting the ciphertext Z; and
(g) step of decrypting the ciphertext Z to a transmission text $M_B$ using the initial random number Y, the confidentiality increase matrix C, and the error correction decoding function g.

[3] In the secret communication method according to [1], a quantum cryptography protocol is used for generating the initial random numbers of the sender and the receiver, estimating the error ratio of the initial random numbers X and Y, and estimating the upper limit of the eavesdropped information amount.

[4] In the secret communication method according to [2], a quantum cryptography protocol is used for generating the initial random numbers of the sender and the receiver, estimating the error ratio of the initial random numbers X and Y, and estimating the upper limit of the eavesdropped information amount.

[5] In the secret communication method according to claim 1 or 3, the transmission information M is encrypted to establish Z=BM+(I,A+BC)TX, where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

[6] In the secret communication method according to [2] or [4], the transmission information M is encrypted to establish a following relationship:

$$Z = F\begin{pmatrix} D \\ M - CD \end{pmatrix} + X$$

where F denotes the encryption function.

[7] In the secret communication method according to [5], the ciphertext Z is decrypted to establish:

$$M_B = (C, I)g\left(T^{-1}\begin{pmatrix} Z \\ 0 \end{pmatrix} - Y\right)$$

where $T^{-1}$ as an inverse matrix of T denotes a decryption auxiliary variable.

[8] In the secret communication method according to [2], [4] or [6], the ciphertext is decrypted to $M_B$=(C,I)g(Z−Y).

[9] In the secret communication method according to any one of [1] to [8], elements of Z/dZ are used for all random numbers and matrices without using bits, where XOR denotes a sum on the Z/dZ, and d denotes a natural number.

[10] A first device according to the present invention includes means for sharing n-bit initial random numbers X, Y (initial random number generation units 101, 115 shown in FIG. 5); units for storing the initial random numbers (initial random number storage units 102, 116 shown in FIG. 5); means for estimating an error ratio of the initial random numbers X and Y to determine an encoding ratio m/n (error ratio estimation unit 104 shown in FIG. 5); unit for estimating an upper limit value k of an amount of information with respect to the initial random number X possibly eavesdropped by an eavesdropper (eavesdropped information amount estimation unit 119 shown in FIG. 5); means for inputting m−k-bit information M (input unit 106 shown in FIG. 5); means for determining a function required for encryption encoding (encryption function determination unit 107 shown in FIG. 5); means for encryption (encryption unit 103 shown in FIG. 5); means for determining an error correction decoding function g used for secret communication (error correction decoding function determination unit 121 shown in FIG. 5); means for determining a decryption auxiliary variable for decryption (decryption auxiliary variable determination unit 114); means for decoding an error correction (error correction decoding unit 122 shown in FIG. 5); means for decryption (decryption unit 117 shown in FIG. 5); means for transmitting a ciphertext Z (transmission unit 109, public communication path 110, reception unit 111 shown in FIG. 5); means for determining a matrix used for enhancing confidentiality of communication (confidentiality increase matrix generation unit 108, 123 shown in FIG. 5); and an output unit 120 for outputting decrypted information $M_B$.

By adopting such configuration to convert the information with the initial random number and the encoding unit so as to be transmitted, the secret communication using the public communication path less frequently compared with the related art can be realized.

[11] A second device according to the present invention includes means for generating a k-bit random number D (random number generation unit 105 shown in FIG. 7) in addition to the above means of the first device according to the present invention. Further, the means for determining the decryption auxiliary variable for decryption (decryption auxiliary determination unit 114 shown in FIG. 5) of the first device according to the present invention can be cut off.

By adopting such configuration, the workload required for the encryption unit 103 and the decryption unit 117 can be reduced compared with the first device according to the present invention. Further, the secret communication can be performed using the public communication path less frequently than the related art.

[12] A secret communication method for efficiently communicating information between a sender and a receiver at remote locations using correlated initial random numbers X and Y respectively held by the sender and the receiver without leakage of the information to a third party under the situation that the information may be leaked to the third party includes:

(a) step of estimating each error ratio of the initial random numbers X and Y;

(b) step of estimating an upper limit of an eavesdropped information amount;

(c) step of determining an error correction code based on an estimated value of the error ratio, an encryption function corresponding to the error correction code, an error correction decoding function g, and a decryption auxiliary variable;

(d) step of determining a confidentiality increase matrix C stochastically based on the estimated upper limit value of the eavesdrop information amount and an encoding ratio of the error correction code;

(e) step of uniquely generating a ciphertext from information M to be sent to the receiver using the encryption function, the initial random number X, and the confidentiality increase matrix C;

(f) step of transmitting the ciphertext Z; and (g) step of decrypting the ciphertext Z to a transmission text $M_B$ using the initial random number Y, the confidentiality increase matrix C, the decryption auxiliary variable, and the error correction decoding function g.

[13] A secret communication method for efficiently communicating information between a sender and a receiver at remote locations using correlated initial random numbers X and Y respectively held by the sender and the receiver without leakage of the information to a third party under the situation that the information may be leaked to the third party includes:

(a) step of estimating each error ratio of the initial random numbers X and Y;

(b) step of estimating an upper limit of an eavesdropped information amount;

(c) step of determining an error correction code based on an estimated value of the error ratio, an encryption function F corresponding to the error correction code, and an error correction decoding function g;

(d) step of determining a confidentiality increase matrix C stochastically based on the estimated upper limit value of the eavesdropped information amount and an encoding ratio of the error correction code;

(e) step of uniquely generating a ciphertext Z from information M to be sent to the receiver using the encryption function, the initial random number X, the confidentiality increase matrix C and a random number D;

(f) step of transmitting the ciphertext Z; and (g) step of decrypting the ciphertext Z to a transmission text $M_B$ using the initial random number Y, the confidentiality increase matrix C, and the error correction decoding function.

[14] In the secret communication method according to [12], a quantum cryptography protocol is used for generating the initial random numbers of the sender and the receiver, estimating the error ratio of the initial random numbers X and Y, and estimating the upper limit of the eavesdropped information amount.

[15] In the secret communication method according to [13], a quantum cryptography protocol is used for generating the initial random numbers of the sender and the receiver, estimating the error ratio of the initial random numbers X and Y, and estimating the upper limit of the eavesdrop information amount.

[16] In the secret communication method according to [12] or [14], the transmission information M is encrypted to establish Z=BM+(I,A+BC)TX, where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

[17] In the secret communication method according to [13] or [15], the transmission information M is encrypted to establish a following relationship:

$$Z = F\begin{pmatrix} D \\ M - CD \end{pmatrix} + X$$

where F denotes the encryption function.

[18] In the secret communication method according to [16], the ciphertext Z is decrypted to establish:

$$M_B = (C, I)g\left(T^{-1}\begin{pmatrix} Z \\ 0 \end{pmatrix} - Y\right)$$

where $T^{-1}$ as an inverse matrix of T denotes a decryption auxiliary variable.

[19] In the secret communication method according to [13], [15], or [17], the ciphertext is decrypted to $M_B=(C, I)g(Z-Y)$.

[20] In the secret communication method according to [13], a Toeplitz matrix is used for generating the confidentiality increase matrix C.

[21] In the secret communication method according to any one of [12] to [20], elements of Z/dZ are used for all random numbers and matrices without using bits, where XOR denotes a sum on the Z/dZ, and d denotes a natural number.

[22] A secret communication device for efficiently communicating information between a sender and a receiver at remote locations using correlated initial random numbers X and Y respectively held by the sender and the receiver without leakage of the information to a third party under the situation that the information may be leaked to the third party includes: initial random number generation units (201, 215) for sharing n-bit initial random numbers X and Y; initial random number storage units (202, 216) for storing the initial random numbers X and Y; an error ratio estimation unit (204) for estimating an error ratio of the initial random numbers X and Y to determine an encoding ratio m/n; an eavesdrop information amount estimation unit (219) for estimating an upper limit value k of an amount of information with respect to the initial random number X possibly eavesdropped by an eavesdropper; an input unit (206) for inputting m−k-bit information M; an encryption function determination unit (207) for or determining a function required for encryption encoding; an encryption unit (203) for encryption; an error correction decoding function determination unit (221) for determining an error correction decoding function g used for secret: communication; a decryption auxiliary variable determination unit (214) for determining a decryption auxiliary variable used for decryption; an error correction decoding unit (222) for decoding an error correction; a decryption unit (217) for decryption; a transmission unit (209), a public communication path (210) and a reception unit (211) for transmitting a ciphertext Z; a confidentiality increase matrix generation unit (208) for determining a matrix used for enhancing confidentiality of the communication; a transmission unit (212), a public communication path (213) and a reception unit (218) for transmitting the confidentiality increase matrix C; and an output unit (220) for outputting decrypted information $M_B$ from the decryption unit (217).

[23] A secret communication device for efficiently communicating information between a sender and a receiver at remote locations using correlated initial random numbers X and Y respectively held by the sender and the receiver without leakage of the information to a third party who has a chance of eavesdropping the information includes: initial random number generation units (201, 215) for sharing n-bit initial random numbers X and Y; initial random number storage units (202, 216) for storing the initial random numbers X and Y; an error ratio estimation unit (204) for estimating an error ratio of the initial random numbers X and Y to determine an encoding ratio m/n; an eavesdropped information amount estimation unit (219) for estimating an upper limit value k of an amount of information with respect to the initial random number X possibly eavesdropped by an eavesdropper; an input unit (206) for inputting m−k-bit information M; a random number generation unit (205) for generating a random number; an encryption function determination unit (207) for determining a function required for encryption encoding; an encryption unit (203) for encryption; an error correction decoding function determination unit (221) for determining an error correction decoding function used for secret communication; an error correction decoding unit (222) for decoding an error correction; a decryption unit (217) for decryption; a transmission unit (209), a public communication path (210) and a reception unit (211) for transmitting a ciphertext Z; a confidentiality increase matrix generation unit (208) for determining a matrix used for enhancing confidentiality of the communication; a transmission unit (212), a public communication path (213) and a reception unit (218) for transmitting the confidentiality increase matrix C; and an output unit (220) for outputting decrypted information $M_B$ from the decryption unit (217).

[A] The third device of the present invention ([22]) includes means for sharing n-bit initial random numbers X, Y (initial random number generation units 201, 215 as shown in FIG. 9), units for storing the initial random numbers X, Y (initial random number storage units 202, 216 shown in FIG. 9), means for determining an encoding ratio m/n by estimating the ratio of error in the initial random numbers X and Y (error ratio estimation unit 204 shown in FIG. 9), a unit for estimating the upper limit value k of amount of the information with respect to the initial random number X that may be eavesdropped by the eavesdropper (eavesdrop information amount estimation unit 219 shown in FIG. 9), means for inputting m−k-bit information M (input unit 206 shown in FIG. 9), means for determining the function required for encryption encoding (encoding function determination unit 207 shown in FIG. 9), means for encryption (encryption unit 203 shown in FIG. 9), means for determining the decoding function of the error correction code used for the secret communication (error correction decoding function determination unit 221 shown in FIG. 9), means for determining decryption auxiliary variable for decryption (decryption auxiliary variable determination unit 214 shown in FIG. 9), means for decoding the error correction (error correction decoding unit 222 shown in FIG. 9), means for decryption (decryption unit 217 shown in FIG. 9), means for transmitting the ciphertext Z (transmission unit 209, public communication path 210, receiver unit 211 shown in FIG. 9), means for determining the matrix used for enhancing the communication confidentiality (confidentiality increase matrix generation unit 208 shown in FIG. 9), and an output unit 220 for outputting the decrypted information $M_B$.

Such configuration is adopted to convert the information with the initial random number and the encoding unit so as to be transmitted to realize the secret communication using the public communication path less frequently compared with the related art.

[B] The fourth device of the present invention includes means for generating k-bit random number D (random number generation unit 205 shown in FIG. 11) in addition to the above means of the third device of the present invention. By adopting such configuration, the workload of the encryption unit 203 and the decryption unit 217 can be reduced compared with the first device according to the present invention. The fourth device of the present invention realizes the secret communication with the public communication path less frequently compared with the related art.

BEST MODE FOR CARRYING OUT THE INVENTION

The secret communication method according to the present invention for efficiently communicating information between a sender and a receiver at remote locations using correlated initial random numbers X and Y respectively held by the sender and the receiver without leakage of the information to a third party under the situation that the information may be leaked to the third party includes: step of estimating each error ratio of the initial random numbers X and Y; step of estimating an upper limit of an eavesdropped information amount; step of determining an error correction code based on an estimated value of the error ratio, an encryption function corresponding to the error correction code, an error correction decoding function g, and a decryption auxiliary variable; step of uniquely determining a confidentiality increase matrix C based on the estimated upper limit value of the eavesdrop information amount and an encoding ratio of the error correction code; step of uniquely generating a ciphertext Z from transmission information M to be sent to the receiver using the encryption function, the initial random number X, and the confidentiality increase matrix C; step of transmitting the ciphertext Z; and step of decrypting the ciphertext Z to a transmission text $M_B$ using the initial random number Y, the confidentiality increase matrix C, the decryption auxiliary variable, and the error correction decoding function g.

The secret communication method according to the present invention with improved security for efficiently communicating information between a sender and a receiver at remote locations using correlated initial random numbers X and Y respectively held by the sender and the receiver without leakage of the information to a third party under the situation that the information may be leaked to the third party includes: step of estimating each error ratio of the initial random numbers X and Y; step of estimating an upper limit of an eavesdropped information amount; step of determining an error correction code based on an estimated value of the error ratio, an encryption function determined by the error correction code, an error correction decoding function g, and a decryption auxiliary variable; step of determining a confidentiality increase matrix C stochastically based on the estimated upper limit value of the eavesdropped information amount and an encoding ratio of the error correction code; step of uniquely generating a ciphertext from information M to be sent to the receiver using the encryption function, the initial random number X, and the confidentiality increase matrix C; step of transmitting the ciphertext Z; and step of decrypting the ciphertext Z to a transmission text $M_B$ using the initial random number Y, the confidentiality increase matrix C, the decryption auxiliary variable, and the error correction decoding function g.

Embodiments of the present invention will be described hereinafter.

Figure 1:
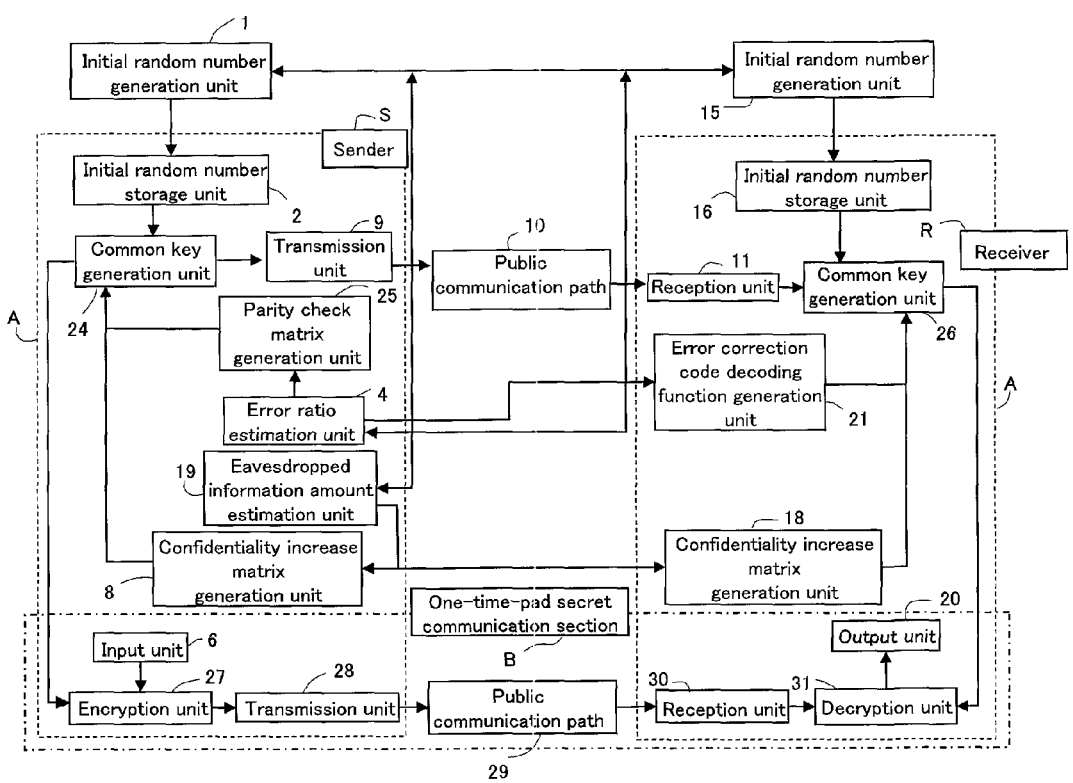
FIG. 1 is a block diagram of a secret communication device according to related art (Non-Patent Document 2).
Figure 2:
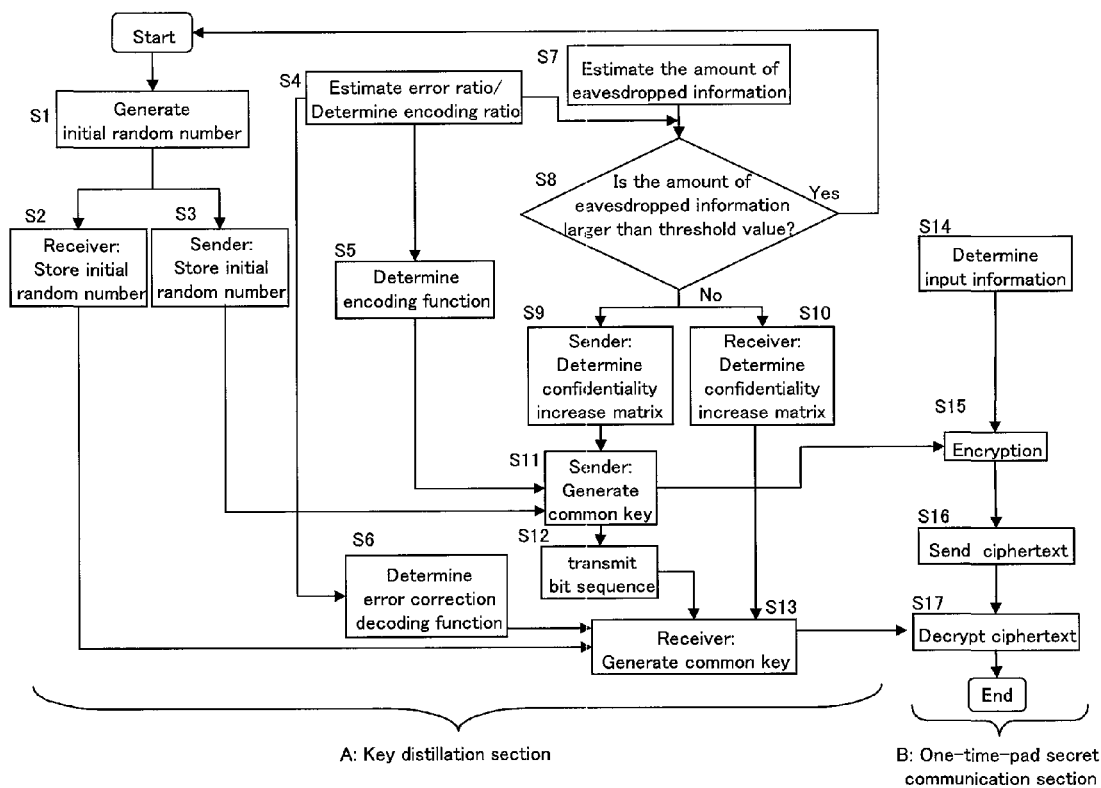
FIG. 2 is a flowchart showing a secret communication method according to the related art (Non-Patent Document 2).
Figure 3:
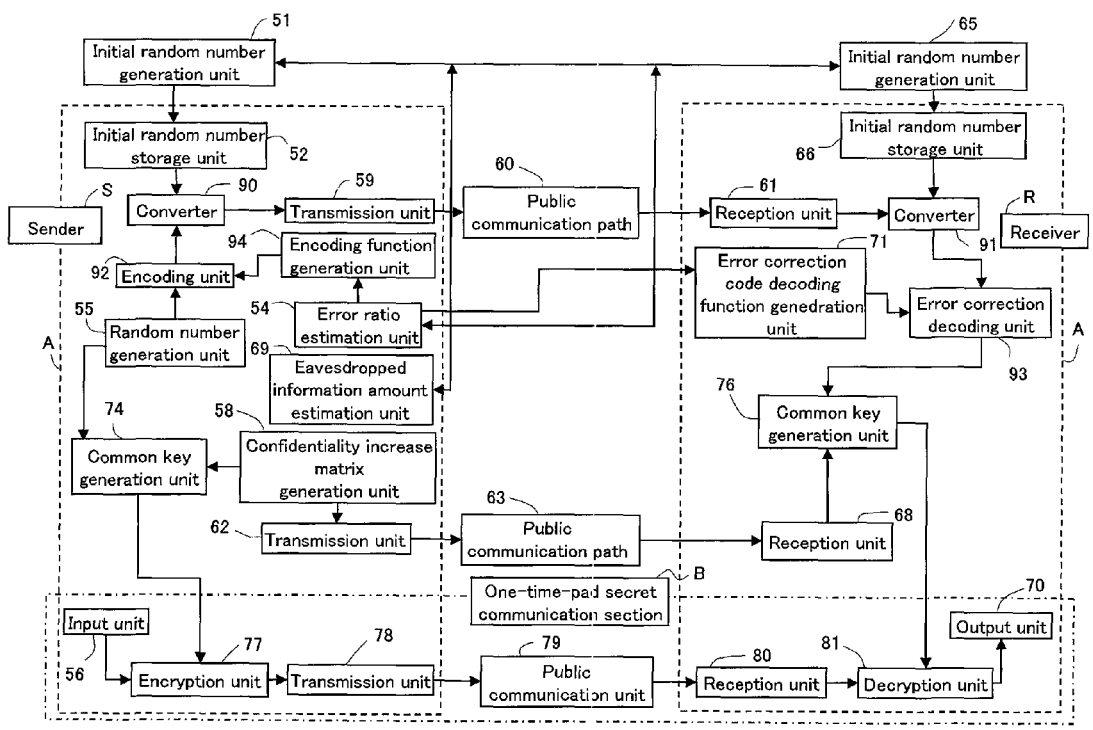
FIG. 3 is a block diagram of a secret communication device according to another related art (Non-Patent Document 5).
Figure 4:
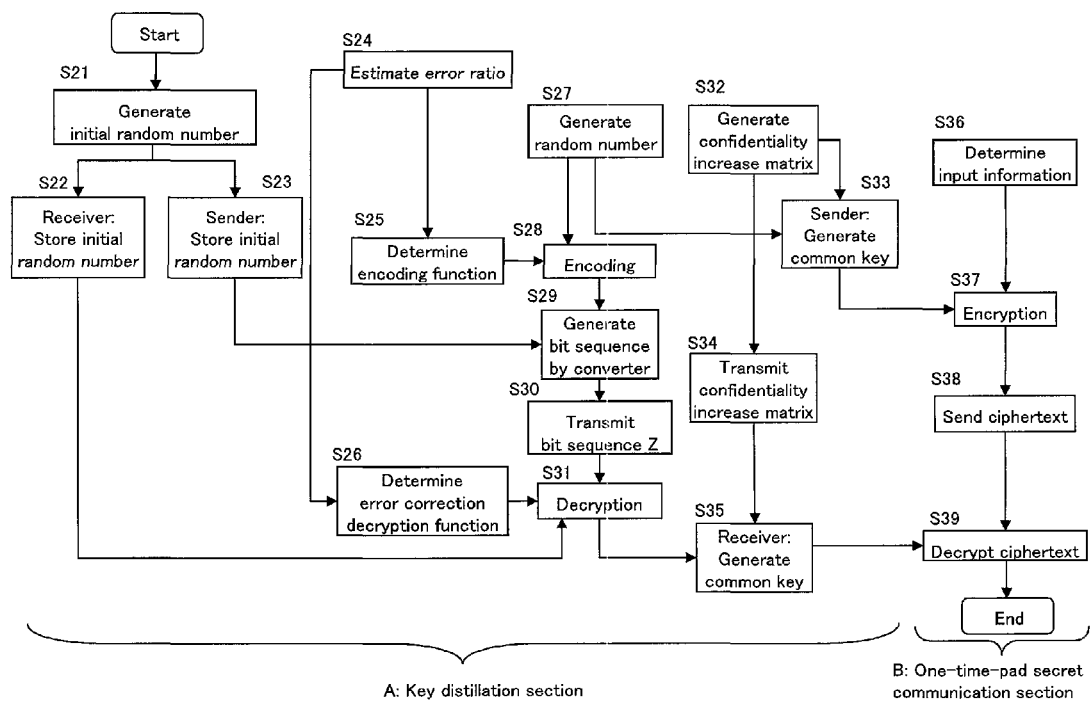
FIG. 4 is an operation flowchart showing a secret communication method according to the related art (Non-Patent Document 5).
Figure 5:
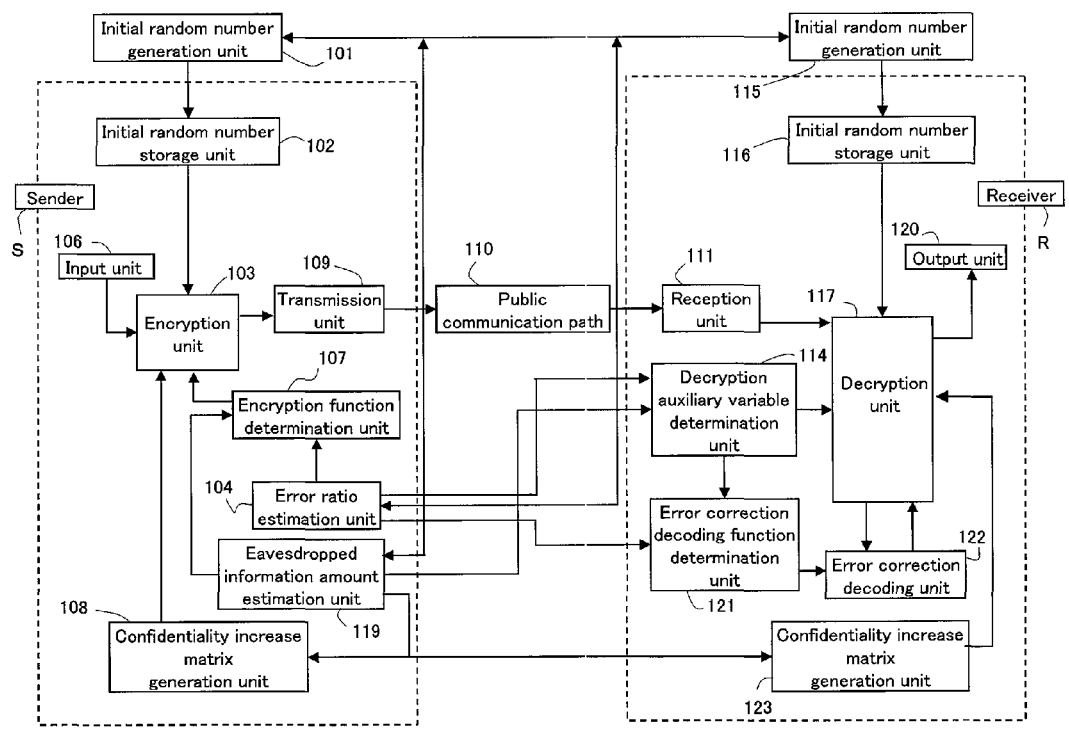
FIG. 5 is a block diagram showing a secret communication device according to a first embodiment of the present invention.
Figure 6:
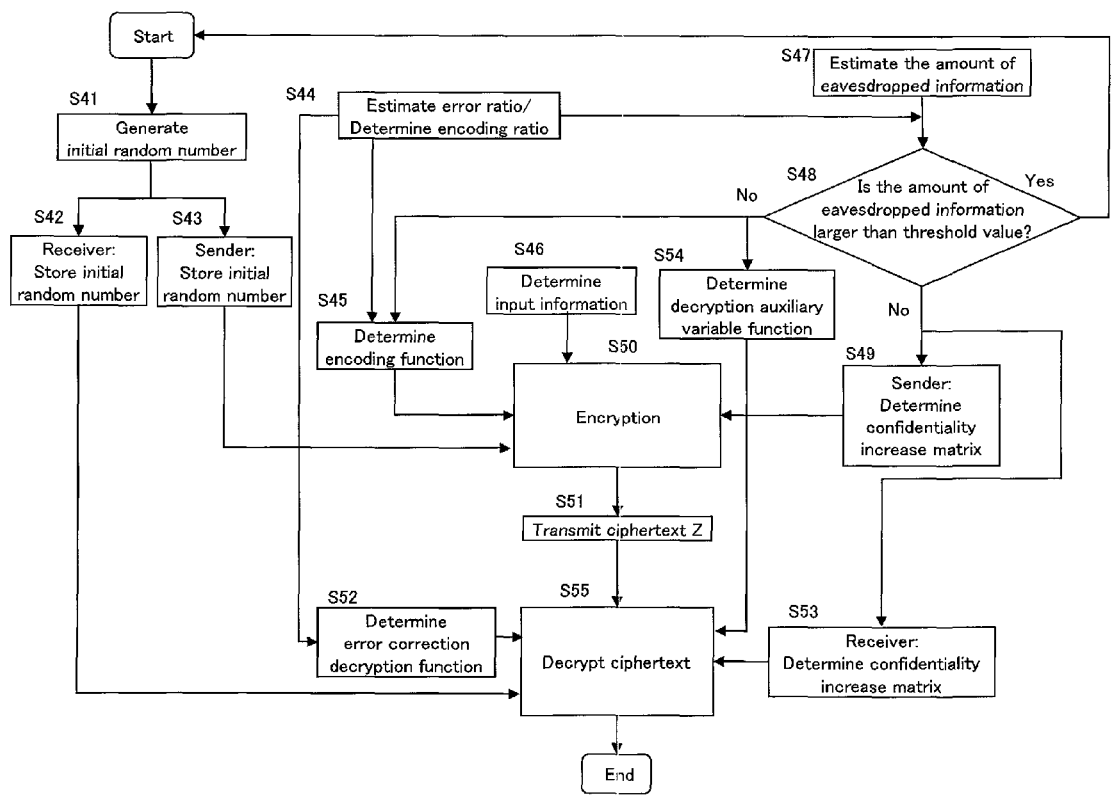
FIG. 6 is a flowchart showing a secret communication method according to the first embodiment of the present invention.

FIG. 5 is a block diagram showing a secret communication device according to a first embodiment of the present invention and FIG. 6 is a flowchart showing a secret communication method using the secret communication device.

Referring to the drawings, the secret communication device according to the first embodiment of the present invention includes an input unit 106 for inputting information M to be transmitted, an output unit 120 for outputting the decrypted information $M_B$, initial random number generation units 101, 115, initial random number storage units 102, 116, an error ratio estimation unit 104, an eavesdrop information amount estimation unit 119, an encryption unit 103, an encryption function determination unit 107, a decryption unit 117, a decryption auxiliary variable determination unit 114, an error correction decoding unit 122 for decoding the error correction code, an error correction code decoding function determination unit 121, confidentiality increase matrix generation units 108, 123, a transmission unit 109, a public communication path 110, and a reception unit 111. In the embodiment, the error correction estimation unit 104 and the eavesdropped information amount estimation unit 119 are provided for the sender side, however, they may be provided for the receiver side.

The initial random number generation units 101, 115 generate n-bit initial random numbers X and Y, respectively. The error ratio estimation unit 104 estimates the ratio of mismatched bits (error ratio) in the initial random numbers (bit sequence) X of the sender S and the initial random numbers (bit sequence) Y of the receiver R, and further determines the encoding ratio m/n in accordance with the estimated error ratio.

The eavesdropped information amount estimation unit 119 estimates the upper limit value of the amount of information with respect to the initial random number X of the sender S which may be eavesdropped by the eavesdropper. For example, when the correlated initial random numbers X and Y are generated through the quantum communication, the error ratio is estimated by the sender S and the receiver R for making a portion of the generated initial random numbers open to calculate the mismatched ratio.

In the aforementioned case, the upper limit value of the eavesdropped information amount may be calculated based on the estimated value of the error ratio with respect to the other base likewise the key distillation case.

In the case where the initial random number is generated through the quantum communication, various methods for estimating the upper limit of the eavesdropped information amount has been introduced in accordance with the situation (see Non-Patent Document 4). However, arbitrary configurations may be employed as the initial random number generation units 101, 115, the error ratio estimation unit 104, and the eavesdropped information amount estimation unit 119 so long as they are combined to generate the initial random number and to estimate the upper limit of the eavesdropped information amount at the same time.

The confidentiality increase matrix generation units 108, 123 preliminarily store m−k×k confidentiality increase matrices with respect to all the possible values as integers k and m, respectively.

Referring to FIGS. 5 and 6, the operation of the first embodiment of the present invention will be described in detail.

The encoding ratio m/n per possible error ratio is obtained prior to the actual communication. An n×m matrix F for encoding the error correction linear code and the error correction decoding function g for decoding are obtained in accordance with the corresponding encoding ratio. The n×n matrix T and the inverse matrix $T^{-1}$, n−k×k matrix A and n−k×m−k matrix B which satisfy the following condition are obtained using sweep-out method. The terms A, B and T denote the encryption functions, and the inverse matrix $T^{-1}$ is used as the decryption auxiliary variable.

$$TF = \begin{pmatrix} A & B \\ I_k & 0_{k,m-k} \end{pmatrix}$$

The term $I_k$ denotes the unit matrix of k×k, and $O_{k,m-k}$ denotes the zero matrix of k×m−k. The matrices A, B and T are stored in the encryption function determination unit 107 for each of the possible error ratios, respectively. The error correction decoding function g for each of the possible error ratios is stored in the error correction code decoding function determination unit 121. The inverse matrix $T^{-1}$ for each of the possible error ratios is stored in the decryption auxiliary variable determination unit 114.

Then n-bit initial random numbers X and Y are generated (step S41). The sender S and the receiver R store the initial random numbers X and Y in the initial random number storage units 101 and 115, respectively (steps S42, S43). The error ratio is estimated by the error ratio estimation unit 104 to determine the encoding ratio n/m (step S44), that is, the value of m is determined.

The eavesdropped information amount estimation unit 119 estimates the upper limit value k of the amount of information with respect to the initial random number X of the sender S which may be eavesdropped by the eavesdropper (step S47). If the value k is larger than the value m, the initial random number is invalidated to start the process again (step S48). If the value k is smaller than the value m, the confidentiality increase matrix generation units 108 and 123 for the sender S and the receiver R generate m−k×k confidentiality increase matrices C, respectively (steps S49, S53).

The encryption function is determined (step S45), the decryption function is determined (step S52), and the decryption auxiliary variable is determined (step S54) in accordance with the values of m and k. The matrices A, B and T each as the encryption function is determined by the encryption function determination unit 107. The error correction decoding function g is determined by the error correction code decoding function determination unit 121. The inverse matrix $T^{-1}$ as the decryption auxiliary variable is determined by the decryption auxiliary variable determination unit 114.

Then the m−k-bit input information M is determined by the input unit 106 (step S46).

The input information M is encrypted to the n−k bit sequence:

$$Z = BM + (I_{n-k}A + BC)TX$$

by the encryption unit 103 using the matrices A, B, T, the initial random number X and the confidentiality increase matrix C (step S50). The term $I_{n-k}$ denotes the n−k×n−k unit matrix.

The sender S transmits the n−k-bit transmission bit sequence Z to the receiver R through the transmission unit 109, the public communication path 110, and the reception unit 111 (step S51).

The n−k-bit sequence Z is decrypted to the m−k bit sequence $M_B$ as below by the decryption unit 117 using the inverse matrix $T^{-1}$, the initial random number Y, the confidentiality increase matrix C and the error correction decoding unit 122 (step S55).

$$M_B = (C, I)g\left(T^{-1}\begin{pmatrix} Z \\ 0 \end{pmatrix} - Y\right)$$

The bit sequence $M_B$ is output from the output unit 120.

The secret communication method for efficiently communicating information between a sender and a receiver at remote locations using correlated initial random numbers X and Y respectively held by the sender and the receiver without leakage of the information to a third party under the situation that the information may be leaked to the third party includes: step of estimating each error ratio of the initial random numbers X and Y; step of estimating an upper limit of an eavesdropped information amount; step of determining an error correction code based on an estimated value of the error ratio, an encryption function corresponding to the error correction code, an error correction decoding function g, and a decryption auxiliary variable; step of uniquely determining a confidentiality increase matrix C based on the estimated upper limit value of the eavesdropped information amount and an encoding ratio of the error correction code; step of uniquely generating a ciphertext Z from transmission information M to be sent to the receiver using the encryption function, the initial random number X, and the confidentiality increase matrix C; step of transmitting the ciphertext Z; and step of decrypting the ciphertext Z to a transmission text $M_B$ using the initial random number Y, the confidentiality increase matrix C, the decryption auxiliary variable, and the error correction decoding function g.

A second embodiment according to the present invention will be described referring to the drawings.

Figure 7:
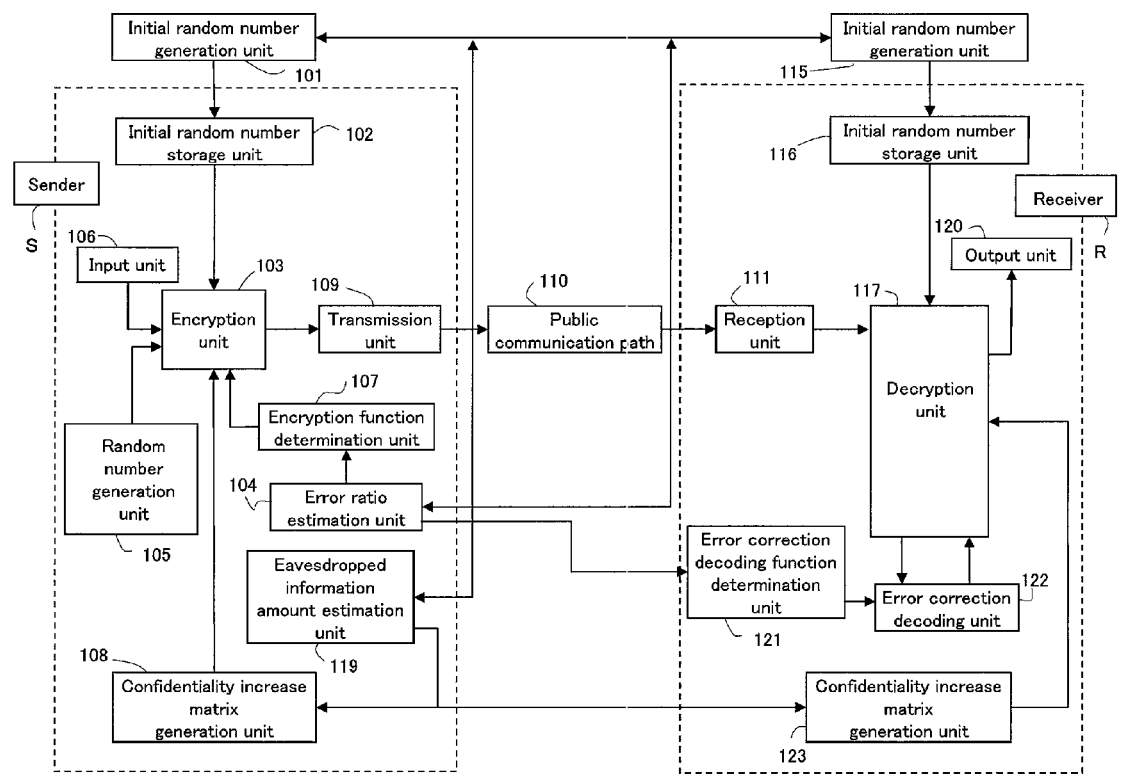
FIG. 7 is a block diagram showing a secret communication device according to a second embodiment of the present invention.
Figure 8:
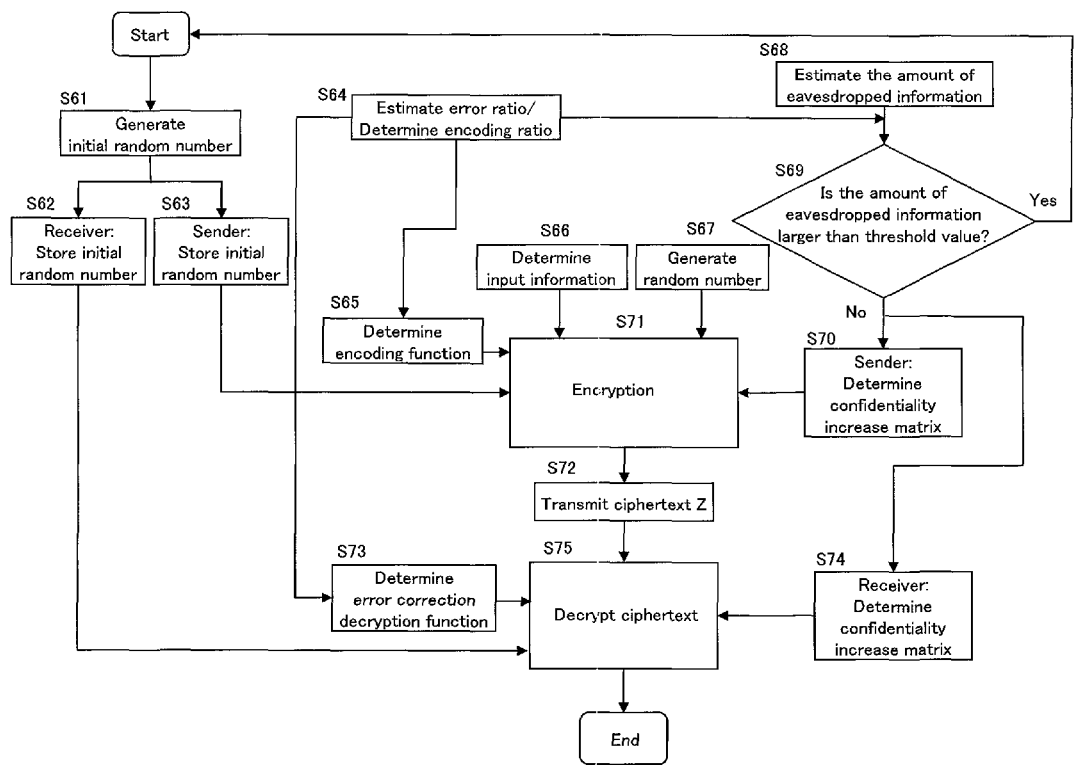
FIG. 8 is a flowchart showing a secret communication method according to the second embodiment of the present invention.

FIG. 7 is a block diagram showing a configuration of a secret communication device according to the second embodiment of the present invention and FIG. 8 is a flowchart showing the secret communication method using the secret communication device.

The same elements as those described in the first embodiment will be designated with the same reference numerals, and explanations thereof, thus will be omitted.

The configuration according to the second embodiment is formed by adding a random number generation unit 105 for generating a random number D to the structure according to the first embodiment, and eliminating the decryption auxiliary variable determination unit 114 therefrom. The error ratio estimation unit 104 and the eavesdropped information amount estimation unit 119 are provided for the sender side, however, they may be provided for the receiver side.

Referring to FIGS. 7 and 8, the operation of the configuration of the second embodiment of the present invention will be described with respect to the difference between the first and the second embodiments.

The encoding ratio m/n for each of the possible error ratios is determined prior to the actual communication. The n×m matrix F for encoding the error correction linear code and the error correction decoding function g for decoding are determined in accordance with the respective encoding ratios. The resultant matrix F for each of the possible error ratios is stored in the encryption function determination unit 107. The error correction decoding function g for each of the possible error ratios is stored in the error correction code decoding function determination unit 121.

The process in steps from S41 to S44 according to the first embodiment is executed (steps S61 to 64). Then the encryption function F is determined by the encryption function determination unit 107, and the error correction decoding function g is determined by the error correction code decoding function determination unit 121 in accordance with the value of m (steps S65, S73). Then the process in steps from S47 to S49 according to the first embodiment is executed (steps S68 to S70, S74).

The m−k-bit information M is determined by the input unit 106 (step S66), and the k-bit random number D is generated by the random number generation unit 105 (step S67). The encryption unit 103 generates the n-bit ciphertext (step S71) obtained by adding the initial random number X to the n-bit output of the encoding unit so as to be transmitted by the encryption unit 103 using the m−k×k confidentiality increase matrix C (step S70) and the resultant ciphertext is output.

$$Z = F\begin{pmatrix} D \\ M - CD \end{pmatrix} + X$$

The sender S uses the transmission unit 109, the public communication path 110, and the reception unit 111 to transmit the n-bit ciphertext Z to the receiver R (step S72).

The decryption unit 117 decrypts the n-bit sequence Z to the m−k bit sequence $M_B$ using the initial random number Y, the confidentiality increase matrix C and the error correction decoding unit 122 as below (step S75).

$$M_B = (C,1)g(Z-Y)$$

The bit sequence $M_B$ is output by the output unit 120.

The secret communication method for efficiently communicating information between a sender and a receiver at remote locations using correlated initial random numbers X and Y respectively held by the sender and the receiver without leakage of the information to a third party under the situation that the information may be leaked to the third party includes: step of estimating each error ratio of the initial random numbers X and Y; step of estimating an upper limit of an eavesdropped information amount; step of determining an error correction code based on an estimated value of the error ratio, an encryption function F corresponding to the error correction code, and an error correction decoding function g; step of uniquely determining a confidentiality increase matrix C based on the estimated upper limit value of the eavesdrop information amount and an encoding ratio of the error correction code; step of uniquely generating a ciphertext Z from transmission information M to be sent to the receiver using the encryption function, the initial random number X, the confidentiality increase matrix C and a random number D; step of transmitting the ciphertext Z; and step of decrypting the ciphertext Z to a transmission text $M_B$ using the initial random number Y, the confidentiality increase matrix C, and the error correction decoding function g.

In the first and the second embodiments, the error ratio estimation unit and the eavesdropped information amount estimation unit are provided for the sender side, however, they may be provided for either the sender side or the receiver side.

The other embodiment according to the present invention will be described in detail.

Figure 9:
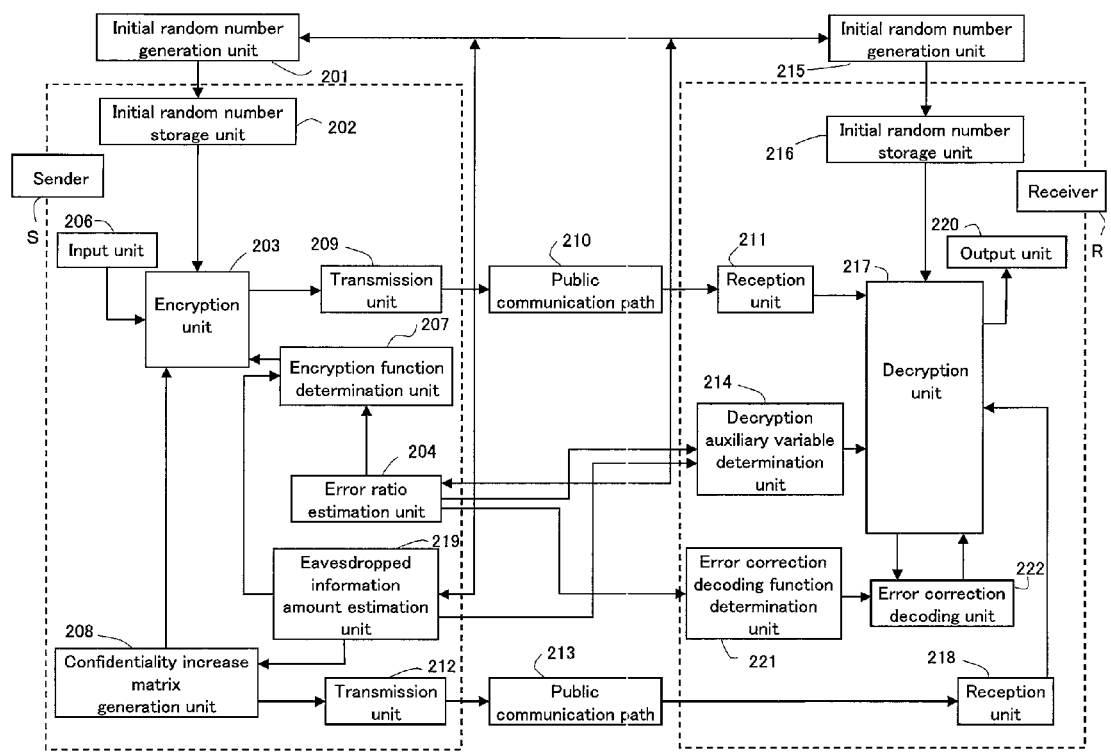
FIG. 9 is a block diagram showing a secret communication device according to a third embodiment of the present invention.
Figure 10:
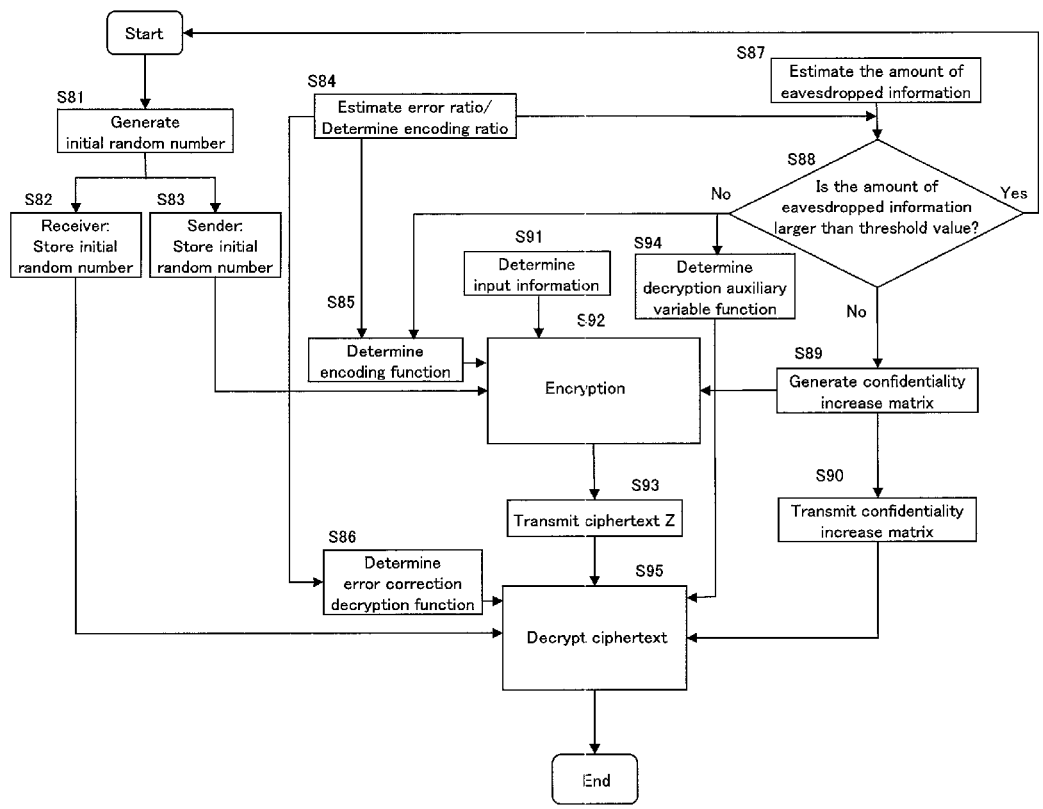
FIG. 10 is an operation flowchart of the secret communication device according to the third embodiment of the present invention.

FIG. 9 is a block diagram showing a secret communication device according to a third embodiment of the present invention. FIG. 10 is an operation flowchart of the secret communication device.

Referring to the drawings, the secret communication device according to the third embodiment of the present invention includes an input unit 206 for inputting information M to be transmitted, an output unit 220 for outputting the decrypted information $M_B$, initial random number generation units 201, 215, initial random number storage units 202, 216, an error ratio estimation unit 204, an eavesdropped information amount estimation unit 219, an encryption unit 203, an encryption function determination unit 207, a decryption unit 217, a decryption auxiliary variable determination unit 214, an error correction decoding unit 222 for decoding the error correction code, an error correction code decoding function determination unit 221, a confidentiality increase matrix generation unit 208, a transmission unit 209, a public communication path 210, a reception unit 211, a transmission unit 212 for transmitting the confidentiality increase matrix D, a public communication path 213, and a reception unit 218. The error ratio estimation unit 204 and the eavesdropped information amount estimation unit 219 are provided for the sender side, however, they may be provided for the receiver side.

The initial random number generation units 201, 215 generate n-bit initial random numbers X and Y, respectively. The error ratio estimation unit 204 functions in estimating the ratio of unmatched bits (error ratio) in the initial random numbers (bit sequence) X and Y of the sender S and the receiver R, and functions in determining the encoding ratio m/n in accordance with the error ratio.

The eavesdropped information amount estimation unit 219 functions in estimating the upper limit value of the amount of information with respect to the initial random number X of the sender S, which may be eavesdropped by the eavesdropper. For example, when the correlated initial random numbers X and Y are generated through the quantum communication, the error ratio is estimated by calculating the unmatched rate with respect to the generated initial random numbers partially made public by the sender S and the receiver R.

In the aforementioned case, the upper limit of the eavesdropped information amount may be calculated based on the estimated value of the error ratio with respect to the other base likewise the key distillation case.

In the case of generating the initial random number through the quantum communication, various methods for estimating the upper limit of the eavesdropped information amount have been introduced in accordance with the situation (see Non-Patent Document 4). However, arbitrary configuration may be employed as the initial random number generation units 201, 215, the error ratio estimation unit 204, and the eavesdropped information amount estimation unit 219 so long as they are combined to generate the initial random number and estimate the error ratio and the upper limit of the eavesdropped information amount at the same time.

The confidentiality increase matrix generation unit 208 does not store the confidentiality increase matrix C for each size, however, it functions in generating the confidentiality increase matrix C stochastically.

Referring to FIGS. 9 and 10, the operation of the third embodiment of the present invention will be described in detail.

The encoding ratio m/n for each of the possible error ratios is determined prior to the actual communication. In accordance with the encoding ratio, the n×m matrix F for encoding the error correction linear code and the error correction decoding function g for decoding are determined. The n×n matrix T, the inverse matrix $T^{-1}$, n−k×k matrix A and n−k× m−k matrix B which satisfy the following condition are obtained with the sweep-out method. The matrices A, B and T become encryption functions.

$$TF = \begin{pmatrix} A & B \\ I_k & 0_{k,m-k} \end{pmatrix}$$

The term $I_k$ denotes the k×k unit matrix, and $O_{k,m-k}$ denotes k×m−k zero matrix, respectively. The matrices A, B and T for the respective possible error ratios are stored in the encryption function determination unit 207. The error correction decoding function g for the respective possible error ratios are stored in the error correction code decoding function determination unit 221. The inverse matrix $T^{-1}$ for the respective possible error ratios is stored in the decryption auxiliary variable determination unit 214 as the decryption auxiliary variable.

Then n-bit initial random numbers X and Y are generated so as to be stored in the initial random number storage units 201, 215 by the sender S and the receiver R, respectively (steps S81 to S83). The error ratio is estimated by the error ratio estimation unit 204 to determine the encoding ratio n/m (step S84). That is, the value of m is determined.

The upper limit value k of the amount of information with respect to the initial random number X of the sender S which may be eavesdropped by the eavesdropper is estimated by the eavesdropped information amount estimation unit 219 (step S87). If the value k is larger than the value m, the process returns to start the routine again. If the estimated eavesdrop information amount k is smaller than the value m, the sender S is only allowed to operate the confidentiality increase matrix generation unit 208 to generate the m−k×k confidentiality increase matrix C using Toeplitz matrix (steps S88 and S89). That is, m−1 random numbers $X_1, \ldots, X_{m-1}$ are individually generated and $C_{i,j}$, the i,j components of the confidentiality increase matrix C, is given with $X_{i+j-1}$. Any method may be used for generating the confidentiality increase matrix C so long as it is stochastic. Further, the confidentiality increase matrix C may be sent to the sender S through the transmission unit 212, the public communication path 213, and the reception unit 218.

Then the matrices A, B and T are determined by the encryption function determination unit 207, the error correction decoding function g is determined by the error correction code decoding function determination unit 221, and the inverse matrix $T^{-1}$ is determined by the decryption auxiliary variable determination unit 214, respectively in accordance with the values of m and k (steps S85, S86, and S94).

The m−k-bit input information M is determined by the input unit 206 (step S91).

The encryption unit 203 is operated to encrypt the input information M to the n−k-bit sequence using the matrices A, B and T, the initial random number X, and the confidentiality increase matrix C as follows (step S92).

$$Z = BM + (I_{n-k}A + BC)TX$$

where $I_{n-k}$ denotes the n−k×n−k unit matrix.

The sender S transmits the n−k-bit transmission bit sequence Z to the receiver R through the transmission unit 209, the public communication path 210, and the reception unit 211 (step S93).

The decryption unit 217 is operated to decrypt the n−k-bit sequence Z to the m−k-bit sequence $M_B$ as follows using the inverse matrix $T^{-1}$, the initial random number Y, the confidentiality increase matrix C and the error correction decoding unit 222 (steps S90 and S95).

$$M_B = (C, I)g\left(T^{-1}\begin{pmatrix} Z \\ 0 \end{pmatrix} - Y\right)$$

The bit sequence $M_B$ is output by the output unit 220.

A fourth embodiment according to the present invention will be described referring to the drawings.

Figure 11:
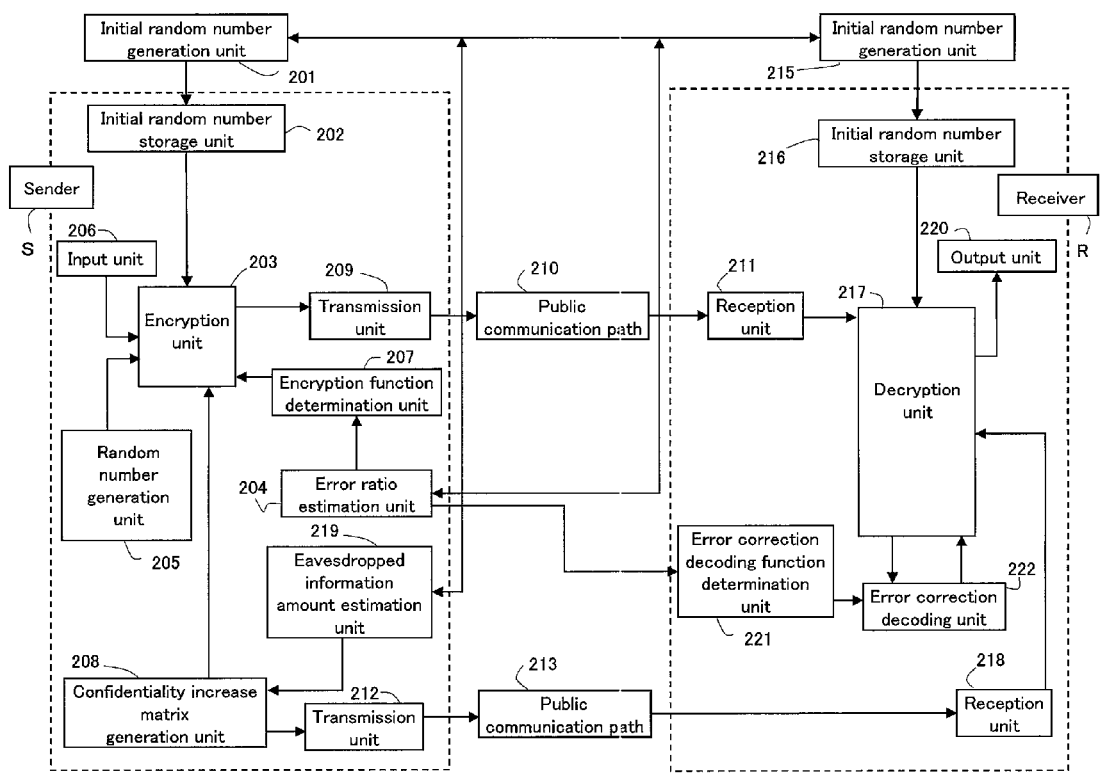
FIG. 11 is a block diagram showing a secret communication device according to a fourth embodiment of the present invention.
Figure 12:
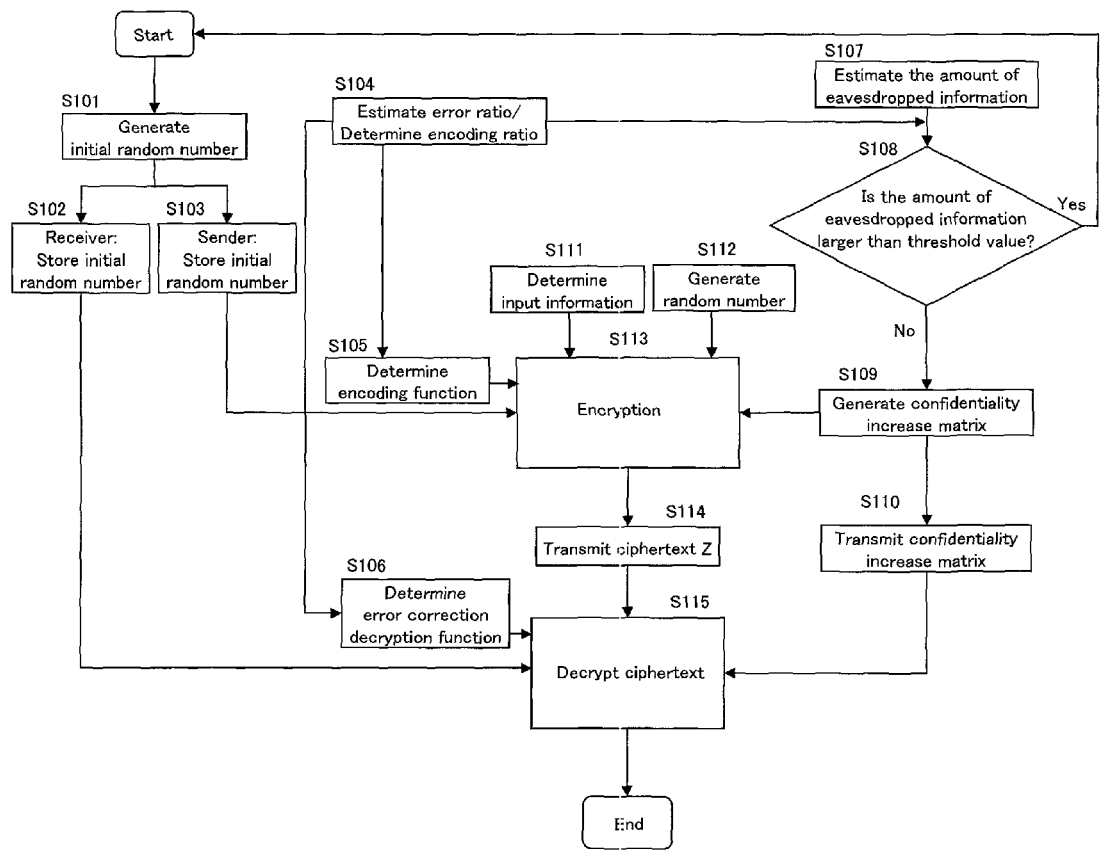
FIG. 12 is an operation flowchart of the secret communication device according to the fourth embodiment of the present invention.

FIG. 11 is a block diagram showing the configuration of the secret communication device. FIG. 12 is an operation flowchart of the secret communication device.

The configuration according to the fourth embodiment is formed by adding a random number generation unit 205 for generating the random number D to the configuration according to the third embodiment, and eliminating the decryption auxiliary variable determination unit 214 therefrom. In the embodiment, the error ratio estimation unit 204 and the eavesdropped information amount estimation unit 219 are provided for the sender side, however, they may be provided for the receiver side.

The operation of the configuration according to the fourth embodiment of the present invention will be described referring to FIGS. 11 and 12.

The difference between the third and the fourth embodiments of the present invention will be described.

The encoding ratio m/n for each of the possible error ratio is determined prior to the actual communication. In accordance with the respective encoding ratios, the n×m matrix F for encoding the error correction linear code and the error correction decoding function g for decoding are determined such that the matrix F for each of the respective possible error ratio is stored in the encryption function determination unit 207. The error correction decoding function g for each of the respective possible error ratio is stored in the error correction code decoding function determination unit 221.

The process in steps S81 to S84 according to the third embodiment is executed (steps S101 to S104). Then the encryption function F and the error correction decoding function g are determined in accordance with the value of m by the encryption function determination unit 207 and the error correction code decoding function determination unit 221, respectively (steps S105 and S106).

The process in steps S87 to S90 according to the third embodiment is executed (steps S107 to S110).

The m−k-bit input information M is determined by the input unit 206 (step S111), and the k-bit random number D is generated by the random number generation unit 205 (step S112). The encryption unit 203 is operated to generate the n-bit ciphertext as follows by adding the initial random number X to the n-bit output of the encoding unit using the m−k×k confidentiality increase matrix C so as to be output (step S109).

$$Z = F\begin{pmatrix} D \\ M - CD \end{pmatrix} + X$$

The sender S transmits the n-bit ciphertext Z to the receiver R through the transmission unit 209, the public communication path 210, and the reception unit 211 (step S114).

The decryption unit 217 is operated to decrypt the n-bit sequence Z to the m−k-bit sequence $M_B$ using the initial random number Y, the confidentiality increase matrix C and the error correction decoding unit 222 as follows (step S115).

$$M_B=(C,I)g(Z-Y)$$

Finally, the bit sequence $M_B$ is output by the output unit 220.

According to the third and the fourth embodiments of the present invention, the error ratio estimation unit and the eavesdropped information amount estimation unit are provided for the sender side, however, they may be provided for either the sender side or the receiver side.

The present invention is not Limited to the aforementioned embodiments, but may be modified into various forms which do not deviate from the scope of the present invention.

The present invention reduces the number of times for using the public communication path as a whole, and the entire workload. Unlike the related art where the secret communication has been executed in two stages for the key distillation section and the one-time-pad secret communication unit, the secret communication may be directly executed without requiring the key distillation processing.

The present invention reduces the number of times for using the public communication path as a whole, and the entire workload to further improve the communication security.

INDUSTRIAL APPLICABILITY

The secret communication method and the secret communication device are applicable to the secret communication by reducing the number of times for using the public communication path as a whole and the entire workload reduced. The aforementioned method and the device are also applicable to the encryption unit for communication that demands high security against the eavesdropping, and the electronic authentication, electronic transaction, and electronic voting system based on the random number sequence.

The invention claimed is:

1. A secret communication method for efficiently communicating information between a device at a sender side and a device at a receiver side, each at remote locations, using correlated initial random numbers X and Y respectively held at the sender and the receiver sides, the method comprising:
   (a) estimating an error ratio between the initial random numbers X and Y, stored in initial random number storage units of the devices at the sender and the receiver sides under the situation that the information can be leaked to the third party, the estimating performed by an error estimation unit provided in the device at the sender side or the device at the receiver side;
   (b) estimating an upper limit of an eavesdropped information amount by an eavesdropped information amount estimation unit provided in the device at the sender side or the device at the receiver side;
   (c) step of determining, at the device of the sender side, an error correction code based on the estimated value of the error ratio, an encryption function corresponding to the error correction code by an encryption function determination unit, and determining at the device at the receiver side, an error correction decoding function g, and a decryption auxiliary variable by an error correction code decoding function determination unit, respectively;
   (d) uniquely determining a confidentiality increase matrix C based on the estimated upper limit value of the eavesdropped information amount and an encoding ratio of the error correction code, by confidentiality increase matrix generation units provided in the devices at the sender and the receiver sides;
   (e) uniquely generating a ciphertext Z from transmission information M to be sent to the device at the receiver side using the encryption function, the initial random number X, and the confidentiality increase matrix C by an encryption unit provided in the device at the sender side;
   (f) transmitting the ciphertext Z from a transmission unit at the device at the sender side to a reception unit at the device at the receiver side via a public communication path; and
   (g) decrypting the ciphertext Z to a transmission text $M_B$ using the initial random number Y, the confidentiality increase matrix C, the decryption auxiliary variable, and the error correction decoding function by an encryption decoding unit and an error correction decoding unit provided in the device at the receiver side.

2. The secret communication method according to claim 1, wherein a quantum cryptography protocol is used for generating the initial random numbers X and Y by the devices at the sender and the receiver sides, estimating the error ratio of the initial random numbers X and Y by the device at the sender side, and estimating the upper limit of the eavesdrop information amount.

3. The secret communication method according to claim 1, wherein the transmission information M is encrypted to establish Z=BM+(I,A+BC)TX, where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

4. The secret communication method according to claim 3, wherein the ciphertext Z is decrypted to establish:

$$M_B = (C, I)g\left(T^{-1}\begin{pmatrix} Z \\ 0 \end{pmatrix} - Y\right)$$

where $T^{-1}$ as an inverse matrix of T denotes a decryption auxiliary variable.

5. The secret communication method according to claim 1, wherein elements of Z/dZ are used for all random numbers and elements of the matrix without using bits, where XOR denotes a sum on the Z/dZ, and d denotes a natural number.

6. A secret communication method for efficiently communicating information between a device at a sender side and a device at a receiver side, each at remote locations, using correlated initial random numbers X and Y respectively held at the sender and the receiver sides comprising:
   (a) estimating an error ratio between the initial random numbers X and Y, stored in initial random number storage units of the devices at the sender and the receiver sides under the situation that the information can be leaked to the third party, the estimating performed by an error estimation unit provided in the device at the sender side or the device at the receiver side;
   (b) estimating an upper limit of an eavesdrop information amount by an eavesdropped information amount estimation unit provided in the device at the sender side or the device at the receiver side;

(c) determining, at the device of the sender side, an error correction code based on an estimated value of the error ratio, and an encryption function F corresponding to the error correction code by an encryption function determination unit, and determining, at the device at the receiver side, an error correction decoding function g, by an error correction code decoding function determination unit, respectively;

(d) uniquely determining a confidentiality increase matrix C based on the estimated upper limit value of the eavesdropped information amount and an encoding ratio of the error correction code by confidentiality increase matrix generation units provided in the devices at the sender and the receiver sides;

(e) generating a k-bit random number D by a random number generation unit in the device at the sender side;

(f) uniquely generating a ciphertext Z from transmission information M to be sent to the device at the receiver side using the encryption function, the initial random number X, the confidentiality increase matrix C, and the a random number D encryption unit provided in the device at the sender side;

(g) transmitting the ciphertext Z from a transmission unit at the device at the sender side to a reception unit at the device at the receiver side via a public communication path; and (h) decrypting the ciphertext Z to a transmission text $M_B$ using the initial random number Y, the confidentiality increase matrix C, and the error correction decoding function g by an encryption decoding unit and an error correction decoding unit provided in the device at the receiver side.

7. The secret communication method according to claim 6, wherein a quantum cryptography protocol is used for generating the initial random numbers X and Y by the devices at the sender and the receiver sides, estimating the error ratio of the initial random numbers X and Y by the device at the sender side, and estimating the upper limit of the eavesdrop information amount.

8. The secret communication method according to claim 6, wherein the transmission information M is encrypted to establish a following relationship:

$$Z = F\begin{pmatrix} D \\ M - CD \end{pmatrix} + X$$

where F denotes the encryption function.

9. The secret communication method according to claim 6, wherein the ciphertext is decrypted to $M_B=(C,I)g(Z-Y)$ where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

10. A secret communication device for efficiently communicating information between a device at a sender side and a device at a receiver side, each at remote locations, using correlated initial random numbers X and Y respectively held at the sender and the receiver sides, comprising:

(a) initial random number generation units for generating n-bit initial random numbers X and Y provided in the devices at the sender and the receiver sides;

(b) initial random number storage units for storing the initial random numbers X and Y provided in the devices at the sender and the receiver sides under the situation that the information can be leaked to the third party;

(c) an error ratio estimation unit for estimating an error ratio of the initial random numbers X and Y to determine an encoding ratio m/n provided in the device at the sender side or the device at the receiver side;

(d) an eavesdropped information amount estimation unit provided in the device at the sender side or the device at the receiver side for estimating an upper limit value k of an amount of information with respect to the initial random number X possibly eavesdropped by an eavesdropper;

(e) an input unit for inputting m−k-bit transmission information M provided in the device at the sender side;

(f) an encryption function determination unit for determining a function required for encryption encoding provided in the device at the sender side;

(g) an encryption unit for encryption provided in the device at the sender side;

(h) an error correction decoding function determination unit for determining an error correction decoding function g used for secret communication in accordance with the respective error ratios provided in the device at the receiver side:

(i) a decryption auxiliary variable determination unit for determining a decryption auxiliary variable for decryption provided in the device at the receiver side;

(j) an error correction decoding unit for decoding an error correction using the error correction decoding function g provided in the device at the receiver side;

(k) a decryption unit for decryption provided in the device at the receiver side;

(l) a transmission unit, a public communication path, and a reception unit for transmitting a ciphertext Z encrypted by the encryption unit, from the device at the sender side to the device at the receiver side;

(m) a confidentiality increase matrix generation unit for determining a matrix C used for enhancing confidentiality of communication provided in the device at the sender and the device at the receiver side; and (n) an output unit for outputting decrypted information $M_B$ from the decryption unit provided in the device at the receiver side.

11. The secret communication method according to claim 10, wherein the transmission information M is encrypted to establish Z=BM+(I,A+BC)TX, where I denotes a unit matrix and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

12. The secret communication method according to claim 11, wherein the ciphertext Z is decrypted to establish:

$$M_B = (C, I)g\left(T^{-1}\binom{Z}{0} - Y\right)$$

where $T^{-1}$ as an inverse matrix of T denotes a decryption auxiliary variable.

13. The secret communication method according to claim 10, wherein the confidentiality increase matrix is m−k×k generated if the value m is smaller than the value k.

14. A secret communication device for efficiently communicating information between a device at a sender side and a device at a receiver side, each at remote locations, using correlated initial random numbers X and Y respectively held by the sender and the receiver sides, comprising:
 (a) initial random number generation units for sharing generating n-bit initial random numbers X and Y provided in the devices at the sender and the receiver sides;
 (b) initial random number storage units for storing the initial random numbers X and Y provided in the devices at the sender and the receiver sides under the situation that the information can be leaked to the third party;
 (c) an error ratio estimation unit for estimating an error ratio of the initial random numbers X and Y to determine an encoding ratio m/n provided in the device at the sender side or the device at the receiver side;
 (d) an eavesdropped information amount estimation unit for estimating an upper limit value k of an amount of information with respect to the initial random number X possibly eavesdropped by an eavesdropper provided in the device at the sender side or the device at the receiver side;
 (e) an input unit for inputting m-k-bit transmission information M provided in the device at the sender side;
 (f) a random number generation unit for generating a k-bit random number D provided in the device at the sender side;
 (g) an encryption function determination unit for determining a function required for encryption encoding provided in the device at the sender side;
 (h) an encryption unit for encryption provided in the device at the sender side;
 (i) an error correction decoding function determination unit for determining an error correction decoding function g used for secret communication in accordance with the respective encoding ratios provided in the device at the receiver side;
 (j) an error correction decoding unit for decoding an error correction by using the error correction decoding function g provided in the device at the receiver side;
 (k) a decryption unit for decryption provided in the device at the receiver side;
 (l) a transmission unit, a public communication path and a reception unit for transmitting a ciphertext Z encrypted by the encryption unit from the device at the sender side to the device at the receiver side;
 (m) a confidentiality increase matrix generation unit for determining a matrix C used for enhancing confidentiality of communication provided in the devices at the sender and the receiver sides; and
 (n) an output unit for outputting decrypted information $M_B$ from the decryption unit provided in the device at the receiver side.

15. The secret communication method according to claim 14, wherein the transmission information M is encrypted to establish a following relationship:

$$Z = F\binom{D}{M - CD} + X$$

where F denotes the encryption function.

16. The secret communication method according to claim 14, wherein the ciphertext is decrypted to $M_B=(C,I)g(Z-Y)$ where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

17. A secret communication method for efficiently communicating information between a device at a sender side and a device at a receiver side, each at remote locations, using correlated initial random numbers X and Y respectively held at the sender and the receiver sides, comprising:
 (a) estimating an error ratio between the initial random numbers X and Y, stored in initial random number storage units of the devices at the sender and the receiver sides under the situation that the information can be leaked to the third party, the estimating performed by an error estimation unit provided in the device at the sender side or the device at the receiver side;
 (b) estimating an upper limit of an eavesdropped information amount by an eavesdropped information amount estimation unit provided in the device at the sender side or the device at the receiver side;
 (c) determining, at the device at the sender side, an error correction code based on the estimated value of the error ratio, an encryption function corresponding to the error correction code by an encryption function determination unit, and determining at the device at the receiver side, an error correction decoding function g, and a decryption auxiliary variable, respectively;
 (d) determining a confidentiality increase matrix C stochastically based on the estimated upper limit value of the eavesdropped information amount and an encoding ratio of the error correction code by confidentiality increase matrix generation units provided in the devices at the sender and receiver sides;
 (e) transmitting the confidentiality increase matrix C from a transmission unit in the device at the sender side to a reception unit at the device at the receiver side via a public communication path;
 (f) uniquely generating a ciphertext from transmission information M to be sent to the device at the receiver side, using the encryption function, the initial random number X, and the confidentiality increase matrix C, by an encryption unit provided in the device at the sender side;
 (g) transmitting the ciphertext Z from a transmission unit in the device at the sender side to a reception unit in the device at the receiver side via a public communication path; and
 (h) decrypting the ciphertext Z to a transmission text $M_B$ using the initial random number Y, the confidentiality increase matrix C, the decryption auxiliary variable, and the error correction decoding function g, by an encryption decoding unit and an error correction decoding unit provided in the device at the receiver side.

18. The secret communication method according to claim 17, wherein a quantum cryptography protocol is used for generating initial random numbers of the sender and the receiver, estimating the error ratio of the initial random numbers X and Y by the device at the sender and the receiver sides, and estimating the upper limit of the eavesdropped information amount by the device at the sender side.

19. The secret communication method according to claim 17, wherein the transmission information M is encrypted to establish Z=BM+(I,A+BC)TX, where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

20. The secret communication method according to claim 19, wherein the ciphertext Z is decrypted to establish:

$$M_B = (C, I)g\left(T^{-1}\begin{pmatrix} Z \\ 0 \end{pmatrix} - Y\right)$$

where $T^{-1}$ as an inverse matrix of T denotes a decryption auxiliary variable.

21. The secret communication method according to claim 19, wherein the ciphertext Z is decrypted to establish:

$$M_B = (C, I)g\left(T^{-1}\begin{pmatrix} Z \\ 0 \end{pmatrix} - Y\right)$$

where $T^{-1}$ as an inverse matrix of T denotes a decryption auxiliary variable.

22. The secret communication method according to claim 17, wherein elements of Z/dZ are used for all random numbers and elements of the matrix without using bits, where XOR denotes a sum on the Z/dZ, and d denotes a natural number.

23. A secret communication method for efficiently communicating information between a device at a sender side and a device at a receiver side, each at remote locations, using correlated initial random numbers X and Y respectively held at the sender and the receiver sides, comprising:

(a) estimating an error ratio between the initial random numbers X and Y, stored in initial random number storage units of the devices at the sender and the receiver sides under the situation that the information can be leaked to the third party, the estimating performed by an error ratio estimation unit provided in the device at the sender side or the device at the receiver side;

(b) estimating an upper limit of an eavesdropped information amount eavesdropped information amount estimation unit provided in the device at the sender side or the device at the receiver side;

(c) determining, at the device at the sender side, an error correction code based on the estimated value of the error ratio, an encryption function F corresponding to the error correction code by an encryption function determination unit, and determining, at the device at the receiver side, and an error correction decoding function g, respectively;

(d) determining a confidentiality increase matrix C stochastically based on the estimated upper limit value of the eavesdropped information amount and an encoding ratio of the error correction code by confidentiality increase matrix generation units provided in the devices at the sender and receiver sides;

(e) transmitting the confidentiality increase matrix C from a transmission unit in the device at the sender side to a reception unit at the device at the receiver side via a public communication path;

(f) generating a k-bit random number D by a random bit generation unit in the device at the sender side;

(g) uniquely generating a ciphertext Z from transmission information M to be sent to the device at the receiver side using the encryption function, the initial random number X, the confidentiality increase matrix C, and the a random number D by an encryption unit provided in the device at the sender side;

(h) step of transmitting the ciphertext Z from a transmission unit in the device at the sender side to a reception unit in the device at the receiver side via a public communication path; and (i) decrypting the ciphertext Z to a transmission text MR using the initial random number Y, the confidentiality increase matrix C, and the error correction decoding function, by an encryption decoding unit and an error correction decoding unit provided in the device at the receiver side.

24. The secret communication method according to claim 23, wherein a quantum cryptography protocol is used for generating the initial random numbers X and Y at the devices of the sender and the receiver sides, estimating the error ratio of the initial random numbers X and Y by the device at the sender side, and estimating the upper limit of the eavesdropped information amount.

25. The secret communication method according to claim 23, wherein the transmission information M is encrypted to establish a following relationship:

$$Z = F\begin{pmatrix} D \\ M - CD \end{pmatrix} + X$$

where F denotes the encryption function.

26. The secret communication method according to claim 23, wherein the ciphertext is decrypted to $M_B=(C,I)g(Z-Y)$ where I denotes a unit matrix, and A, B, and T denote the encryption functions which satisfy a following relationship:

$$TF = \begin{pmatrix} A & B \\ I & 0 \end{pmatrix}$$

wherein F denotes an encoding matrix for error correction corresponding to the error correction decoding function g.

27. The secret communication method according to claim 23, wherein a Toeplitz matrix is used for generating the confidentiality increase matrix C.

28. A secret communication device for efficiently communicating information between a device at a sender side and a device at a receiver side, each at remote locations, using correlated initial random numbers X and Y respectively held by the sender and the receiver sides, comprising:
(a) initial random number generation units for sharing generating n-bit initial random numbers X and Y provided in the devices at the sender and receiver sides;
(b) initial random number storage units for storing the initial random numbers X and Y provided in the devices at the sender and receiver sides under the situation that the information can be leaked to the third party;
(c) an error ratio estimation unit for estimating an error ratio of the initial random numbers X and Y to determine an encoding ratio m/n provided in the devices at the sender side or the device at the receiver side;
(d) an eavesdropped information amount estimation unit for estimating an upper limit value k of an amount of information with respect to the initial random number X possibly eavesdropped by an eavesdropper provided in the devices at the sender side or the device at the receiver side;
(e) an input unit for inputting m−k-bit information M provided in the device at the sender side;
(f) an encryption function determination unit for determining a function required for encryption encoding;
(g) an encryption unit for encryption provided in the device at the sender side;
(h) an error correction decoding function determination unit for determining an error correction decoding function g used for secret communication in accordance with the respective encoding ratios provided in the device at the sender side;
(i) a decryption auxiliary variable determination unit for determining a decryption auxiliary variable used for decryption provided in the device at the receiver side;
(j) an error correction decoding unit for decoding an error correction using the error correction decoding function g provided in the device at the receiver side;
(k) a decryption unit for decryption provided in the device at the receiver side;
(l) a transmission unit, a public communication path, and a reception unit for transmitting a ciphertext Z encrypted by the encryption unit from the device at the sender side to the device at the receiver side;
(m) a confidentiality increase matrix generation unit for determining a matrix used for enhancing confidentiality of the communication provided in the device at the sender side;
(n) a transmission unit, a public communication path, and a reception unit for transmitting the confidentiality increase matrix C from the device at the sender side to the device at the receiver side; and
(o) an output unit for outputting decrypted information $M_B$ from the decryption unit provided in the device at the receiver side.

29. The secret communication method according to claim 28, wherein the transmission information M is encrypted to establish Z=BM+(I,A+BC)TX, where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

30. A secret communication device for efficiently communicating information between a device at a sender side and a device at a receiver side, each at remote locations, using correlated initial random numbers X and Y respectively held by the sender and the receiver sides, comprising:
(a) initial random number generation units for generating n-bit initial random numbers X and Y provided in the devices at the sender and the receiver sides;
(b) initial random number storage units for storing the initial random numbers X and Y provided in the devices at the sender and the receiver sides under the situation that the information can be leaked to the third party;
(c) an error ratio estimation unit for estimating an error ratio of the initial random numbers X and Y to determine an encoding ratio m/n provided in the device at the sender side or the device at the receiver side;
(d) an eavesdropped information amount estimation unit for estimating an upper limit value k of an amount of information with respect to the initial random number X possibly eavesdropped by an eavesdropper provided in the device at the sender side or the device at the receiver side;
(e) an input unit for inputting m−k-bit transmission information M provided in the device at the sender side;
(f) a random number generation unit for generating a k-bit random number provided in the device at the sender side;
(g) an encryption function determination unit for determining a function required for encryption encoding;
(h) an encryption unit for encryption provided in the device at the sender side;
(i) an error correction decoding function determination unit for determining an error correction decoding function used for secret communication in accordance with the respective encoding ratios provided in the device at the sender side;
(j) an error correction decoding unit for decoding an error correction using the error correction decoding function g provided in the device at the receiver side;
(k) a decryption unit for decryption provided in the device at the receiver side;
(l) a transmission unit, a public communication path, and a reception unit for transmitting a ciphertext Z encrypted by the encryption unit, from the device at the sender side to the device at the receiver side;
(m) a confidentiality increase matrix generation unit for determining a matrix used for enhancing confidentiality of the communication provided in the device at the sender side;
(n) a transmission unit, a public communication path, and a reception unit for transmitting the confidentiality increase matrix C from the device at the sender side to the device at the receiving side; and
(o) an output unit for outputting decrypted information $M_B$ from the decryption unit provided in the device at the receiver side.

31. The secret communication method according to claim 30, wherein the transmission information M is encrypted to establish a following relationship:

$$Z = F\begin{pmatrix} D \\ M - CD \end{pmatrix} + X$$

where F denotes the encryption function.

32. The secret communication method according to claim 30, wherein the ciphertext is decrypted to $M_B=(C,I)g(Z-Y)$ where I denotes a unit matrix, and A, B, and T denote the encryption functions which satisfy a following relationship:

$$TF = \begin{pmatrix} A & B \\ I & 0 \end{pmatrix}$$

where F denotes an encoding matrix for error correction corresponding to the error correction decoding function g.

33. The secret communication method according to claim 30, wherein a Toeplitz matrix is used for generating the confidentiality increase matrix C.

\* \* \* \* \*